(12) United States Patent
Meyer et al.

(10) Patent No.: US 12,099,684 B2
(45) Date of Patent: *Sep. 24, 2024

(54) INPUT LOCATION CORRECTION BASED ON DEVICE MOTION

(71) Applicant: Apple Inc., Cupertino, CA (US)

(72) Inventors: Adam S Meyer, Cupertino, CA (US); Mitchell R Lerner, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/231,649

(22) Filed: Aug. 8, 2023

(65) Prior Publication Data

US 2023/0384894 A1  Nov. 30, 2023

Related U.S. Application Data

(63) Continuation of application No. 17/899,406, filed on Aug. 30, 2022, now Pat. No. 11,755,150.
(Continued)

(51) Int. Cl.
| | |
|---|---|
| *G06F 3/041* | (2006.01) |
| *G06F 3/0346* | (2013.01) |
| *G06F 3/042* | (2006.01) |
| *G06F 3/044* | (2006.01) |
| *G06F 3/0481* | (2022.01) |

(Continued)

(52) U.S. Cl.
CPC ........ *G06F 3/04186* (2019.05); *G06F 3/0346* (2013.01); *G06F 3/0425* (2013.01); *G06F 3/044* (2013.01); *G06F 3/0481* (2013.01); *G06F 3/0488* (2013.01); *G06T 7/20* (2013.01);
(Continued)

(58) Field of Classification Search
CPC .................................................. G06F 3/04186
See application file for complete search history.

(56) References Cited

U.S. PATENT DOCUMENTS 9,965,130 B2   5/2018  Kim et al.
10,147,218 B2  12/2018  Alkouh
(Continued)

OTHER PUBLICATIONS

International Search Report and Written Opinion issued Dec. 23, 2022 in corresponding application PCT/US2022/043857.
(Continued)

*Primary Examiner* — Chun-Nan Lin
(74) *Attorney, Agent, or Firm* — Brownstein Hyatt Farber Schreck, LLP

(57) ABSTRACT

An electronic device includes a housing, a display at least partially within the housing, a cover positioned over the display and defining an input surface of the electronic device, a motion sensing system configured to detect a motion of the electronic device, and a touch sensor configured to detect, within a time window after the motion of the electronic device is detected, a contact of an input member of a user on the input surface of the electronic device. The electronic device is configured to determine, for a time prior to the detection of the contact, a relative motion between the input member and the input surface. In accordance with a determination that a characteristic of the relative motion satisfies a threshold condition, the electronic device may determine a second input location based at least in part on the location of the contact and the relative motion.

20 Claims, 10 Drawing Sheets

Related U.S. Application Data

(60) Provisional application No. 63/246,697, filed on Sep. 21, 2021.

(51) Int. Cl.
  *G06F 3/0488* (2022.01)
  *G06T 7/20* (2017.01)

(52) U.S. Cl.
  CPC ............... *G06F 2203/04108* (2013.01); *G06T 2207/10016* (2013.01); *G06T 2207/30196* (2013.01)

(56) References Cited

U.S. PATENT DOCUMENTS

| | | | |
|---|---|---|---|
| 10,290,102 B2 | 5/2019 | Lorenz | |
| 10,395,555 B2 | 8/2019 | Djugash | |
| 10,564,770 B1 | 2/2020 | Keeler et al. | |
| 11,314,335 B2 | 4/2022 | Katz | |
| 11,402,871 B1* | 8/2022 | Berliner | G06F 1/1632 |
| 11,442,582 B1 | 9/2022 | Chakraborty | |
| 2012/0223906 A1 | 9/2012 | Zhou | |
| 2013/0038521 A1* | 2/2013 | Sugaya | H04N 13/207 345/156 |
| 2014/0327641 A1 | 11/2014 | Stoumbos et al. | |
| 2015/0235447 A1* | 8/2015 | Abovitz | G02B 27/4205 345/633 |
| 2016/0011719 A1* | 1/2016 | Andersson | G06F 3/0488 345/178 |
| 2017/0038844 A1 | 2/2017 | Henty | |
| 2017/0123587 A1 | 5/2017 | Yang et al. | |
| 2017/0147125 A1 | 5/2017 | Yang et al. | |
| 2017/0228095 A1 | 8/2017 | Domaradzki et al. | |
| 2019/0130602 A1 | 5/2019 | Hall | |
| 2021/0252388 A1* | 8/2021 | VanWyk | G06F 3/0338 |

OTHER PUBLICATIONS

International Preliminary Report on Patentability for PCT/US2022/043857, mailed Apr. 4, 2024, 10 pages.

* cited by examiner

őINPUT LOCATION CORRECTION BASED ON DEVICE MOTION

CROSS-REFERENCE TO RELATED APPLICATIONS

This application is a continuation patent application of U.S. patent application Ser. No. 17/899,406, filed Aug. 30, 2022, and titled "Input Location Correction Based on Device Motion", which claims the benefit under 35 U.S.C. § 119(e) of U.S. Provisional Patent Application No. 63/246,697, filed Sep. 21, 2021, and titled "Input Location Correction Based on Device Motion", the contents of which are incorporated herein by reference in their entireties as if fully disclosed herein.

FIELD

The described embodiments relate generally to electronic devices, and more particularly to electronic devices and accessories that compensate for errors in touch-based inputs caused by device motion.

BACKGROUND

Handheld electronic devices such as mobile phones and tablet computers provide numerous functions and features, and use graphical user interfaces to allow users to interact with and control those functions and features. For example, handheld electronic devices display input objects such as icons, buttons, keys, and other graphical objects with which a user may interact to control the devices and their various functions. The devices may also display output objects, such as text or images, that convey information to the user.

SUMMARY

An electronic device includes a housing, a display at least partially within the housing, a cover positioned over the display and defining an input surface of the electronic device, a motion sensing system configured to detect a motion of the electronic device, and a touch sensor configured to detect, within a time window after the motion of the electronic device is detected, a contact of an input member of a user on the input surface of the electronic device. The electronic device is configured to determine, for a time prior to the detection of the contact, a relative motion between the input member and the input surface. The input member may be a finger of the user. In accordance with a determination that a characteristic of the relative motion does not satisfy a threshold condition, the electronic device may determine a first input location based on a location of the contact, and in accordance with a determination that the characteristic of the relative motion satisfies the threshold condition, the electronic device may determine a second input location based at least in part on the location of the contact and the relative motion.

Determining the relative motion may include receiving motion data from a wearable electronic device coupled to the user, and determining the relative motion based on the received motion data from the wearable electronic device. The characteristic of the relative motion may be a distance moved by the user's finger along a direction parallel to the input surface. The threshold condition may be a threshold distance. In accordance with a determination that the second input location corresponds to a location of a virtual button on a display associated with the input surface, the electronic device may perform an action associated with the virtual button.

The electronic device may further include a camera, and determining the relative motion between the input member and the input surface may include capturing, with the camera, video of the input member, and analyzing the video of the input member to determine the relative motion between the input member and the input surface.

Determining the relative motion between the input member and the input surface may include detecting motion of the user's wrist. The motion of the user's wrist may be detected using an accelerometer of a wearable electronic device. Determining the relative motion between the input member and the input surface may further include detecting motion of the electronic device, and determining the relative motion between the input member and the input surface based at least in part on the motion of the user's wrist and the motion of the electronic device.

In accordance with a determination that the first input location corresponds to a location of an end-call button displayed on the display, the electronic device may end a telephone call. In accordance with a determination that the second input location corresponds to the location of the end-call button, the electronic device may display, on the display, a confirmatory button that is larger than the end-call button.

A method for determining an input location on a touch-sensitive input surface of an electronic device may include selecting an input-location correction model from a plurality of input-location correction models, detecting a touch event on a touch-sensitive input surface of an electronic device, the touch event corresponding to a contact by an input member of a user on the touch-sensitive input surface, and determining, for a time prior to the detection of the touch event, a motion of the electronic device. The method may further include, in accordance with a determination that a characteristic of the motion does not satisfy a threshold condition, determining a first input location based on a location of the contact, and in accordance with a determination that the characteristic of the motion satisfies the threshold condition, determining a second input location based at least in part on the location of the contact and the motion of the electronic device. The determining may include providing the motion of the electronic device and the location of the contact to the selected input-location correction model and receiving, as output from the selected input-location correction model, the second input location. The method may further include, in accordance with a determination that the second input location corresponds to a location of a virtual button on a display associated with the touch-sensitive input surface, performing an action associated with the virtual button.

The input-location correction model may be a first input-location correction model, the touch event may be a first touch event, the contact may be a first contact, the motion of the electronic device may be a first motion of the electronic device, and the method may further include, after receiving the second input location, detecting a change in a usage context of the electronic device, and in response to detecting the change in the usage context of the electronic device, selecting a second input-location correction model from the plurality of input-location correction models, the second input-location correction model different from the first input-location correction model. The method may further include detecting a second touch event on the touch-sensitive input surface, the second touch event corresponding to a second contact by an input member of a user on the touch-sensitive input surface, determining, for a time prior to the detection of the second touch event, a second motion of the electronic device, and in accordance with a determination that the characteristic of the second motion satisfies the threshold condition, determining, using the second input-location correction model, a third input location based at least in part on the location of the second contact and the second motion of the electronic device. The first input-location correction model may apply a first distance offset to the first contact to determine the second input location, and the second input-location correction model may apply a second distance offset, different from the first distance offset, to determine the third input location.

The method may further include detecting a usage context of the electronic device, and the input-location correction model may be selected from the plurality of input-location correction models based at least in part on the usage context of the electronic device. The usage context may correspond to travel in a vehicle. The method may further include detecting a location of the electronic device, and the input-location correction model may be selected from the plurality of input-location correction models based at least in part on the location of the electronic device.

A method for determining an input location on a touch-sensitive input surface of an electronic device may include detecting a contact of an input member of a user on a touch-sensitive input surface of an electronic device, determining, for a time prior to the detection of the contact, a distance moved by the input member relative to the touch-sensitive input surface, in accordance with a determination that a distance moved by the input member relative to the touch-sensitive input surface does not satisfy a threshold condition, determining a first input location based on a location of the contact, and in accordance with a determination that the distance moved by the input member relative to the touch-sensitive input surface satisfies the threshold condition, and determining a second input location based at least in part on the location of the contact and the distance moved by the input member relative to the touch-sensitive input surface.

Determining the distance moved by the input member relative to the touch-sensitive input surface may include detecting motion of the user's wrist using an accelerometer of a wearable electronic device that is coupled to the user. The distance moved by the input member relative to the touch-sensitive input surface may be a distance in a first plane that is parallel to a second plane defined by the touch-sensitive input surface. The threshold condition may be a first threshold condition, and the method may further include, prior to detecting the contact of the input member on the touch-sensitive input surface, detecting a motion of the electronic device. The operation of determining the second input location may be performed if the distance moved by the input member relative to the touch-sensitive input surface satisfies the first threshold condition and the motion of the electronic device satisfies a second threshold condition.

Determining the distance moved by the input member relative to the touch-sensitive input surface may include capturing video of the input member and analyzing the video of the input member to determine the distance moved by the input member relative to the touch-sensitive input surface. Capturing the video of the input member may include capturing the video of the input member using a camera coupled to the electronic device.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
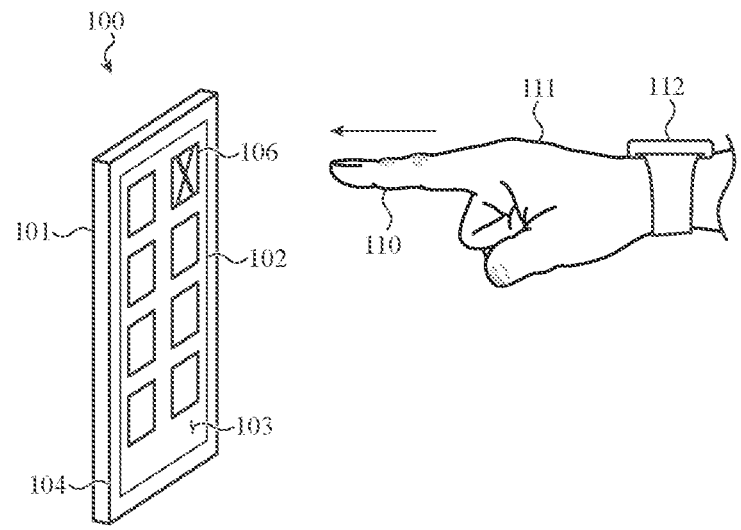
FIGS. 1A-1B illustrate an electronic device receiving a touch input.

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The embodiments herein are generally directed to techniques for improving the operation of electronic devices with touch-sensitive displays under conditions when the device and/or the user's hand are subjected to forces that produce unintended motion of the device and/or the user's hand. In particular, touch-sensitive displays (also referred to herein as touchscreens) may be used in environments where either or both of the display or the user are subjected to forces that may cause a user to miss an intended touch target (e.g., a location on a touchscreen that the user intends to touch, such as a virtual button). For example, when attempting to touch a virtual button on a touch-sensitive display in a vehicle (e.g., in the dashboard), a bump in the road may cause the user's hand to move in an unexpected manner, causing the user to touch the display in an area away from the virtual button (e.g., the user misses their intended touch target). Similar problems may occur in many other contexts and with other devices. For example, bumps, impacts, and other forces may reduce touch-input accuracy when using a mobile phone as a passenger in a vehicle, or while attempting to provide touch inputs to a smart watch during a jog.

Described herein are systems and techniques that can mitigate the effects of dynamic motion environments on touchscreen operation. For example, a touchscreen device, alone or in conjunction with a device attached to a user, may detect conditions that suggest that a touch input may have been affected by an unexpected force acting on the user and/or the device. For example, conditions such as abrupt movements of the user and/or the device prior to or during detection of a touch input may suggest that the touch input was compromised. Information about these movements may then be used to determine where the user was intending to (or is intending to) touch, and adjust the location of the touch input accordingly (e.g., by applying a distance offset to a detected touch location). Returning to the example of a touchscreen in a vehicle, a bump in the road may cause motion of the vehicle's touchscreen and/or the user's hand. This motion may be detected by sensing systems associated with the touchscreen and/or a wearable device on the user's hand. If the detected motion satisfies a condition, such as exceeding a certain distance or acceleration, it may be determined that a touch input received during or after that motion may have been affected by the external force. Information about the detected motion may then be used to correct the touch input to more accurately capture the user's intended touch target.

Several types of motion data may be used to determine whether certain motions are likely to have caused a touch input to have an erroneous input location, and how to correct or compensate for the erroneous input location. For example, absolute motion of a touchscreen and/or a hand, as well as relative motion between the touchscreen and the hand, may be used to provide input location correction as described herein. Absolute motion refers to motion relative to an external frame of reference that is separate from both the touchscreen and the input member (e.g., the earth). Relative motion refers to the motion of the touchscreen relative to the input member, or vice versa (e.g., using either the touchscreen or the input member as the frame of reference to determine the motion of the other).

Absolute and relative motions of the touchscreen and the input member may be used in various ways. For example, absolute motion of a touchscreen device and/or an input member may be used to determine if there was likely a large external force that may have caused a user to miss an intended touch target (e.g., because the absolute motion had a high speed or acceleration characteristic). Relative motion between a touchscreen and an input member may be used to determine more precisely how the absolute motion actually affected the movement of the input member as it approached and contacted the touchscreen. For example, if relative motion indicates that a finger motion has a component that corresponds to an absolute motion of the touchscreen device (e.g., from an external force), the device may subtract that component from the relative motion to estimate an intended touch target. Information about absolute and relative motion of a touchscreen and an input member may be used together or independently to provide input location correction services, as described herein.

In some cases, touch input correction may be applied even without information about the actual relative motion between the user's hand and the touchscreen. For example, in some cases a device with a touchscreen may detect motion to which it is subjected (e.g., using a motion sensing system), but does not have access to information about the actual motion of the user's hand relative to the device. In such cases, when the device detects a contact on the touchscreen, the device may use an input-location correction model to determine where the user likely intended to touch based on the actual contact location and the motion of the device. Thus, if the device detected a large motion just prior to detecting a contact (e.g., within a time window before the contact), the device may apply an offset (e.g., a correction) to the detected input location to determine the intended input location. These and other techniques are described in greater detail herein.

Information about absolute and relative motion of a touchscreen device and/or an input member may be captured or otherwise determined in various ways and using various sensing systems, including but not limited to accelerometers, inertial sensing systems, gravitometers, global positioning systems (GPS), gyroscopes, spatial sensors (e.g., for capturing data characterizing the presence, shape, and/or motion of three-dimensional objects in space), optical sensors (e.g., cameras), near- and/or far-field capacitive sensors, or the like. For example, a wearable device (e.g., a smartwatch) may use an accelerometer to detect absolute motion of a user's hand, and a touchscreen device (e.g., a mobile phone) may use an accelerometer to detect absolute motion of the touchscreen device. As another example, a camera on or near a touchscreen device may capture video of the user's hand, which can be used to determine the relative motion between the touchscreen device and the user's hand. Motion sensing systems may be used alone or in combination with one another, including motion sensing systems of multiple separate devices, to determine absolute motion and/or relative motion of touchscreen devices and input members, as described in greater detail herein.

Figure 1B:
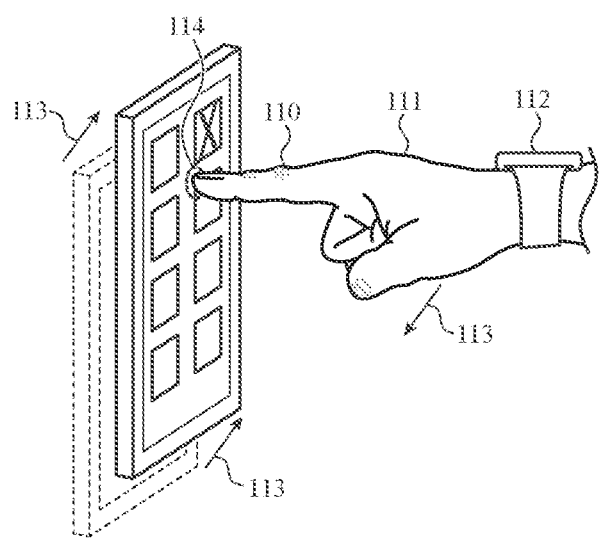

FIGS. 1A and 1B illustrate an example device 100 in use during dynamic motion conditions. The device 100 includes a display 102 at least partially within a housing 101. The housing 101 may include one or multiple housing members and may define a main structure of the device 100. The housing 101 may at least partially define an internal volume of the device 100 in which components of the device 100 may be positioned, and it may at least partially define one or more exterior surfaces of the device 100. The housing members defining the housing 101 may be formed from or include polymer, glass, metal, composites, or any other suitable material(s). The device 100 includes a cover 104 positioned over the display and defining an input surface 103. The cover 104 may be formed from or include glass, sapphire, plastic, or other at least partially transparent material.

The device may include a touch sensor configured to detect a contact of an input member of a user (e.g., a finger 110 of a user's hand 111) on the input surface 103 of the cover 104. Because the touch sensor detects touch-based contacts on the input surface 103, the input surface 103 may be referred to as a touch-sensitive input surface. Further, the term touchscreen may refer collectively to a display, touch sensor, and optionally a cover of a device. Broadly, a user may contact (e.g., touch) a touchscreen of a device to provide inputs to the device, and the touchscreen may detect the contact and the location of the contact and take action accordingly. The touch sensor may be configured to detect contact by various types of input members, such as fingers, styli, prosthetics, or the like. In some cases, the touch sensor is a capacitive touch sensor, though other types of touch sensing technology are also contemplated.

As described herein, motion of a user's hand (or other input member used to provide touch inputs, such as a stylus)

may be determined in various ways, including with wearable electronic devices that can detect motion of an input member. FIGS. 1A-1B illustrate the user wearing a wearable electronic device 112, such as a watch (e.g., a smartwatch). The wearable electronic device 112 may include motion sensing systems, such as one or more accelerometers, inertial sensing systems, gravitometers, global positioning systems, gyroscopes, spatial sensors, optical sensors, near- and/or far-field capacitive sensors, or the like. The wearable electronic device 112 may use such systems to determine absolute motion of the user's hand (and/or an implement being held in the user's hand or otherwise attached to the user). In examples where the input member is another device, such as a stylus, the input member itself may include motion sensing systems that determine absolute motion of the input member.

Motion of a touchscreen device may be determined using motion sensing systems associated with the touchscreen device. For example, the device 100 may include motion sensing components and systems, such as one or more accelerometers, inertial sensing systems, gravitometers, global positioning systems, gyroscopes, spatial sensors, optical sensors, near- and/or far-field capacitive sensors, or the like. In some cases, the motion sensing systems may be physically incorporated in the device 100, such as in the case of motion sensing systems integrated into a mobile phone. In some cases, the motion sensing systems are separate from the device 100, but can detect motion of the device 100 and/or the input member. For example, a camera in a vehicle may capture video of a touchscreen device (e.g., a phone or dash-mounted touchscreen) and/or an input member. The captured video may be used to determine absolute and/or relative motion of the device 100 and/or input member.

Relative motion between a device and an input member may be determined in various ways. In some cases, the device 100 and the wearable electronic device 112 (or other electronic input member) may work in conjunction to determine relative motion between the user's hand and the device 100. For example, the wearable electronic device 112 may send absolute motion data of the input member to the device 100, which then uses the motion data, as well as absolute motion data from its own motion sensing systems and/or components, to determine relative motion between the wearable electronic device 112 and the device 100. More particularly, the device 100 may subtract the absolute motion of the device 100 from the absolute motion of the input member to determine the relative motion.

In some cases, relative motion of the input member (e.g., the user's finger) is determined by the device 100 alone, such as via a spatial sensor coupled to the device 100 that captures video or other optical data of the wearer's hand and analyzes the video (or other optical data) to determine a motion parameter of the relative motion (e.g., a motion vector, motion path, speed, direction, acceleration, distance, or other parameter of the relative motion). Because the spatial sensor is coupled to the device, the motion data that it captures may natively represent relative motion, as any motion of the device 100 is also affecting the spatial sensor.

FIGS. 1A-1B illustrate how motion of the device 100 and/or the user's hand 111 may cause a user to miss their intended touch target on a touchscreen. FIG. 1A illustrates the device 100 displaying a virtual button 106 (e.g., an application icon), which the user is intending to touch with a finger (or other input member such as a stylus). As the user's finger moves towards the input surface 103, the device 100, the user's hand 111 (and thus the finger 110), or both, may be subjected to a force that causes the user's hand 111 to unintentionally and/or unexpectedly move relative to the device, as illustrated by arrows 113. Thus, as shown in FIG. 1B, the user's finger may contact the input surface 103 at a location 114 that is offset from the intended touch target, and optionally misses the intended touch target (as shown). The location of the contact may in fact be offset by a distance and direction that is related to the distance and direction of the relative motion between the device 100 and the user's hand. In some cases, the distance and direction of the relative motion may be the distance and direction of motion in a plane that is parallel to the input surface 103 (e.g., a projection of the relative motion onto the plane of the input surface 103). This type or component of motion may be referred to as lateral motion.

Relative motion between an input member and a device that occurs prior to a touch input event may be caused by unintentional movements of the input member, as described above, but they may also be caused by intentional movements of the input member (e.g., a user simply moving a finger to touch a part of the touchscreen). The techniques described herein allow unintentional relative motion to be determined or estimated such that it can be effectively ignored or isolated from intentional relative motion. In particular, certain motion characteristics of a detected motion may indicate that a subsequently detected relative motion (or component thereof) was unintentional. For example, if a device detects a large acceleration (e.g., from a bump in the road), the subsequent movement of the user's finger, relative to the device, may be at least partially unintentional.

Further, motion characteristics of an absolute motion of the device or the input member may be used to determine what component of a relative motion was likely due to an external force, and therefore unintentional, and what component of the relative motion was intentional. As a specific example, relative motion data captured immediately prior to an input may show that a user's finger moved slowly in a horizontal direction relative to the device 100 (an intentional relative motion), followed by an abrupt motion in a vertical direction relative to the device 100. If the abrupt motion in the nearly vertical direction occurred during or immediately after an absolute motion of the device 100 in a vertical direction, the device 100 may determine that the vertical component of the relative motion may have been erroneous, and may have been caused entirely by the external influence (e.g., it was an unintentional relative motion, or an unintentional component of the relative motion). The device 100 may then compensate for the unintentional relative motion, as described herein.

Returning to FIGS. 1A-1B, the device 100, and optionally the wearable electronic device 112 or other device capable of detecting motion characteristics of the user's hand 111 (and thus finger 110), may determine the relative motion and apply a correction (e.g., a distance offset) to the location of the actual contact (FIG. 1B) to determine the intended touch location (as indicated in FIG. 1A). The device 100 may then take an action based on the corrected touch location, rather than the location of the contact. The device may only take action on detected relative motion if the touch input is detected within a time window after the device is subjected to a force, acceleration, or motion (e.g., as detected by a motion sensing system of the device, such as an accelerometer). In this way, the device differentiates between relative motions that are likely intentional and those that are likely unintentional (e.g., caused by the external forces acting on the device and/or the input member). The time window may be any suitable time window, such as about 1.0 second, 0.75 seconds, 0.5 seconds, 0.25 seconds, or another suitable time window. After the time window has expired, relative motion between the device and the input member may be assumed to be intentional or otherwise not caused by the detected device motion and therefore corrections may not be applied.

The device may also determine whether the absolute and/or relative motion that is detected prior to the touch input satisfies a threshold condition to determine whether or not to apply an input location correction. For example, if the threshold condition is not satisfied (e.g., if a characteristic of the motion is below a threshold value), the device may not apply an input location correction, because the motion is not likely to have caused an erroneous touch location. In such cases, the device may perform an action associated with a virtual button that corresponds to the contact location. If the threshold condition is satisfied, the device may apply an input location correction based on the detected absolute and/or relative motion of the device and/or the input member (e.g., because the motion is likely to have caused an erroneous touch location).

A threshold condition of the absolute and/or relative motion may be a value of a characteristic of the motion. Characteristics of motion refer to quantifiable values of motion that can be detected and/or derived. Example characteristics of motion include distance, speed, acceleration, jerk, direction, duration of motion, motion vectors, motion paths, or any other suitable characteristics.

A characteristic of a motion may satisfy a threshold condition in various ways. For example, a threshold condition may be satisfied if the characteristic of motion exceeds the threshold value, is equal to the threshold value, is below the threshold value, or the like. As one example, a threshold condition relating to an acceleration value of a motion may be whether the acceleration value meets or exceeds a certain value (e.g., 3 m/s$^2$, 4 m/s$^2$, 5 m/s$^2$, or another suitable value). As another example, a threshold condition relating to a distance of a motion may be a distance value that meets or exceeds a certain value (e.g., 0.5 inches, 1 inch, 2 inches, 3 inches, or another suitable value). These acceleration and distance values may indicate that the motion was likely caused by an abrupt, unexpected force acting on the user and/or the device (e.g., a bump in the road), and therefore likely caused a touch input error. Other characteristics of motion may also be indicative of the type of abrupt and unexpected forces that may cause erroneous inputs. Values of such characteristics may be determined, for example, by collecting motion data during real or simulated usage conditions, and identifying the values of the motion characteristics that are associated with unintentional relative motion between a device and a user. Those values may then be used as threshold conditions.

Either or both absolute and relative motions may be evaluated against one or more threshold condition(s) to determine whether or not a relative motion (or component thereof) is likely intentional or unintentional. For example, detecting an absolute motion that satisfies a threshold condition (e.g., a high acceleration value indicative of an accidental impact) may trigger an evaluation of the relative motion to determine how to compensate for the motion. It may then be determined if a threshold condition of the relative motion is satisfied (e.g., the relative motion includes a motion component corresponding to the acceleration and direction of the absolute motion), and if so, a correction may be applied. If the threshold condition of the relative motion is not satisfied, then a correction may not be applied. As another example, as described herein, if a relative motion satisfies a threshold condition without regard to the presence or absence of any absolute motion of the device, a correction may be applied.

In addition to or instead of using threshold conditions to determine if an absolute motion of a device or an input member is likely to have produced erroneous touch inputs, threshold conditions may also be used to determine if a detected relative motion is likely to be indicative of an erroneous input. For example, small motions or cyclic motions may be detected as relative motion between an input member and a device, but those motions may not result in the user missing their intended touch target. Accordingly, as noted above, the device 100 may determine whether a characteristic of the relative motion satisfies a relative motion threshold condition (e.g., the relative motion satisfies a speed, acceleration, or distance threshold condition), and only applies a correction to the location of contact if the motion characteristic of the relative motion satisfies the relative motion threshold condition.

While FIGS. 1A and 1B illustrate the device 100 as a free-standing device, such as a mobile phone or tablet computer, the device 100 may represent any device that incorporates a touchscreen or otherwise defines or includes a touch-sensitive input surface. For example, the device 100 may represent a touchscreen device that is mounted to or otherwise incorporated with a vehicle (e.g., in a dashboard or seat-back of a vehicle), a device that is coupled to a user (e.g., a smartwatch attached to a user's wrist), a device that is mounted to or otherwise incorporated with a machine (e.g., a human-machine interface device of a machine), or the like. Accordingly, the forces that cause the relative motion shown in FIGS. 1A and 1B may be forces that are present in various contexts. In a vehicle, for example, the forces may be forces from bumps, turns, accelerations, decelerations, or the like, to which the vehicle and the user may be subjected.

Figure 2A:
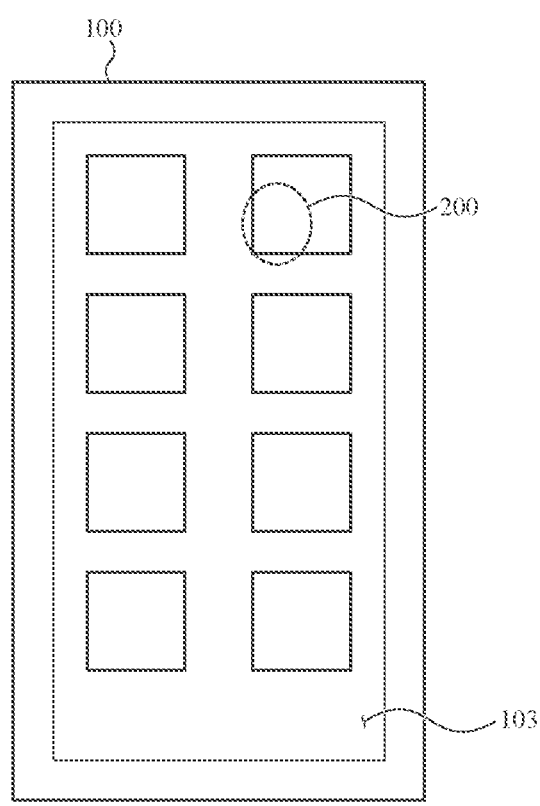
FIGS. 2A-2B illustrate a location of a touch input on an electronic device being affected by motion of the electronic device and/or an input member.
Figure 2B:
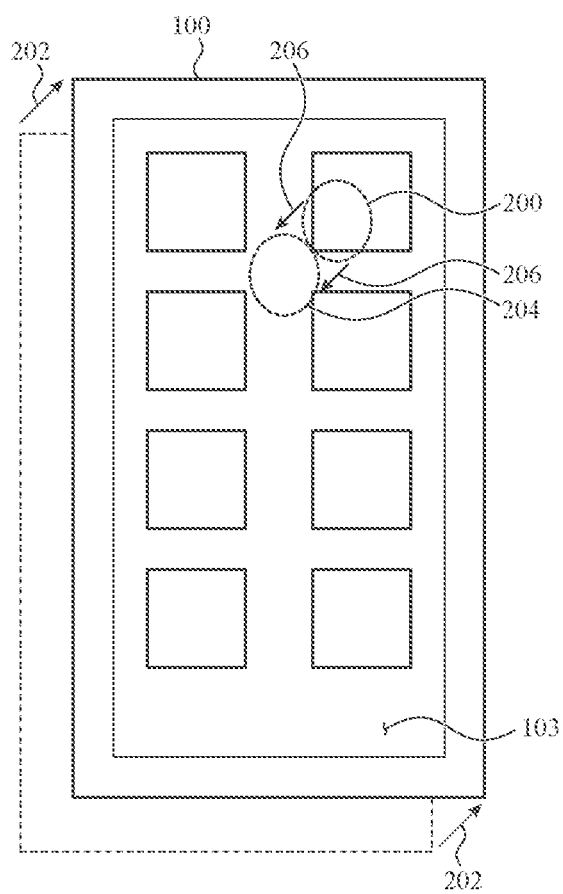

FIGS. 2A-2B provide another example illustration of how motion of a device and/or an input member can result in inaccurate touch inputs. FIG. 2A illustrates an example of an intended touch target 200 on the touch-sensitive input surface 103. As the device 100 and/or the input member move (indicated by arrows 202), the resulting contact location 204 may be offset from the target 200 by a distance and direction, indicated by arrows 206. Motion information or motion data about the input member and/or the device 100 (including characteristics of either or both absolute motion and relative motion) may be used to determine or estimate the distance and/or direction of the offset and modify the contact location 204 or otherwise compensate for it so that the device 100 can proceed as though the intended touch input target 200 were actually touched.

Figure 2C:
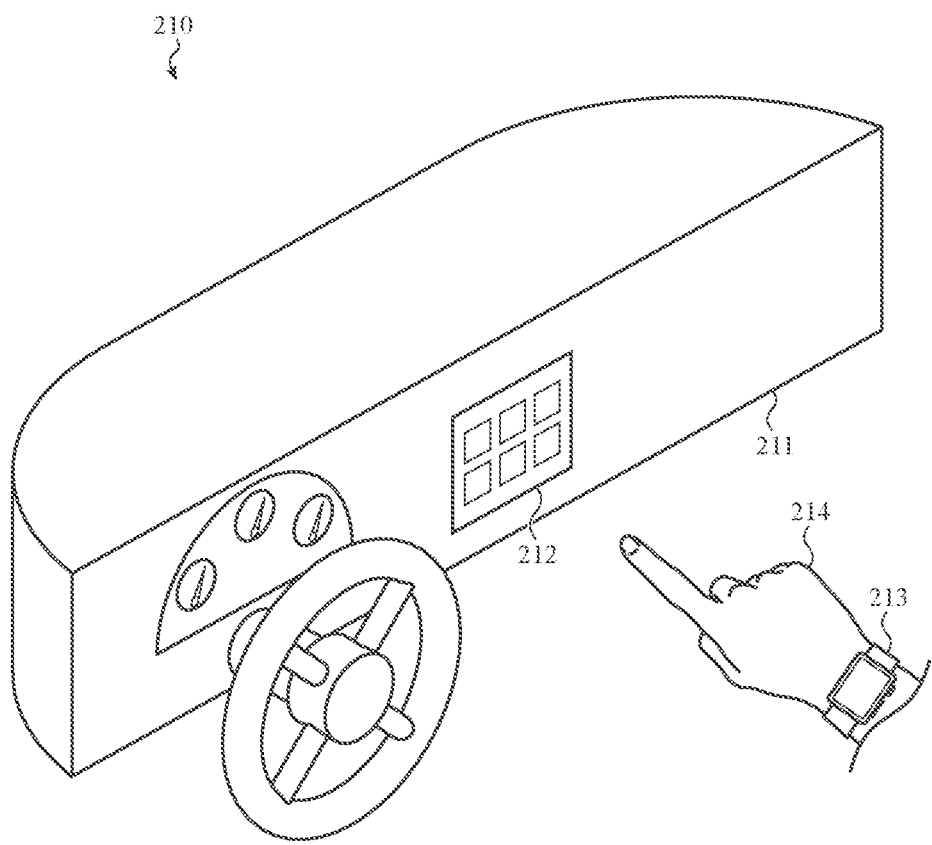
FIG. 2C illustrates a vehicle-based touchscreen in a vehicle receiving a touch input.

FIG. 2C illustrates touch inputs being provided to a touchscreen 212 in dashboard 211 of a vehicle 210 (e.g., from a finger of a hand 214). As described herein, vehicle travel may produce bumps, impacts, or other forces that can cause a user's hand and/or the touchscreen to move abruptly and/or unexpectedly, thereby affecting the accuracy of a touch input. Accordingly, the systems and techniques described herein may be used to detect circumstances in which vehicle motion may have caused an erroneous touch input location on a vehicle-mounted touchscreen (e.g., a permanent dash-mounted touchscreen as shown, or a removable phone or other touchscreen device attached to a vehicle via a mounting mechanism), and to correct or compensate for the erroneous input location. For example, sensing systems associated with the touchscreen (e.g., accelerometers, optical sensors, spatial sensors, etc., incorporated into the touchscreen device and/or the vehicle 210) may detect relative and/or absolute motion between the touchscreen and an input member (e.g., a finger). Additionally or alternatively, a wearable device, such as a smartwatch 213, may detect motion of the user's hand 214, which may be used, alone or in conjunction with information from the vehicle- and/or touchscreen-based sensing systems, to determine parameters of a touch input error and to modify the contact location of a touch input to compensate for the error.

As noted above, various systems and techniques may be used to determine characteristics of absolute motion of a device and an input member and relative motion between a device and an input member. As described with respect to FIGS. 1A-1B, motion sensing systems in a touchscreen device and/or a wearable device may be used to detect absolute and/or relative motion, and characteristics of such motion (e.g., distance, speed, acceleration, jerk, direction, duration of motion, motion vectors, motion paths). In some cases, motion sensing systems may be included in input systems, such as styli, which may also be used to determine relative motion between the device and the input member. External motion sensing systems may also be used, such as spatial sensors that are coupled to a roof of a vehicle.

Figure 3:
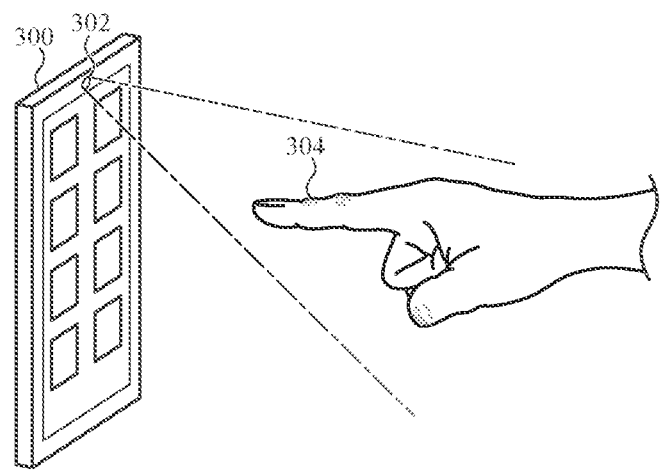
FIG. 3 illustrates an electronic device with a spatial sensor.
Figure 4A:
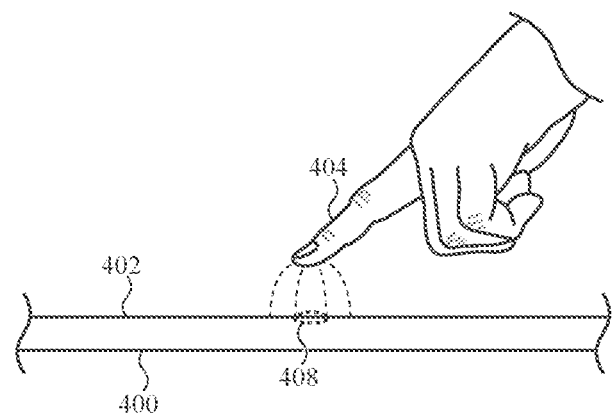
FIGS. 4A-4B illustrate an electronic device with a capacitive touch sensing system for detecting relative motion of an input member.
Figure 4B:
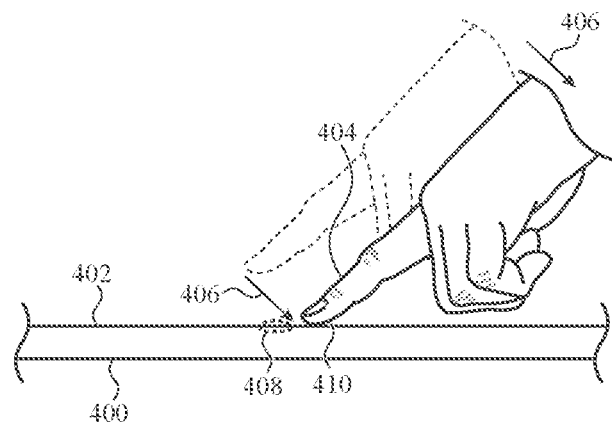

FIGS. 3-4B illustrate various other examples of motion sensing systems that may be used instead of or in addition to accelerometers. FIG. 3, for example, illustrates a device 300 that includes a spatial sensor 302. A spatial sensor may be a system that is configured to capture data characterizing the presence, shape, and/or motion of three-dimensional objects in space. The spatial sensor 302 may be or may include an optical sensing system, such as a camera, a depth sensor (e.g., that detects a depth map of objects proximate the device), or the like. The spatial sensor 302 may capture video of an input member (e.g., with a camera of the spatial sensor 302 or accessible by the spatial sensor 302). The video of the input member may be analyzed by the spatial sensor 302 or other systems of the electronic device to determine motion of the input member. In cases where the spatial sensor 302 uses a camera, the camera may also be used for a camera function of the device (e.g., to capture video and still images of scenes).

In some cases, the spatial sensor 302 is or includes a radar system, LIDAR system, sonar system, or the like. The spatial sensor 302 may directly detect relative motion of the input member 304 (e.g., the user's hand and/or finger), relative to the device 300. For example, because the spatial sensor 302 is mounted to the device 300, it does not need to account for motion of the device 300 itself in order to determine relative motion between the device 300 and the input member 304. Stated another way, the motion of the input member 304 detected by the spatial sensor 302 is necessarily relative motion. In some cases, motion information or motion data from a wearable device may be used in addition to motion information or data from the spatial sensor 302 when determining the relative motion between the input member 304 and the device 300.

In some cases, a spatial sensor may be mounted external to the device 300. For example, a camera in a dashboard of a vehicle may capture motion information of the input member and provide the motion information to the touchscreen device 300. If the spatial sensor is rigidly fixed to the same structure as the device 300 (e.g., the device 300 is a dash-mounted touchscreen and the spatial sensor is a cabin-mounted camera system in a vehicle), the motion information captured by the spatial sensor may directly represent relative motion of the input member.

FIGS. 4A-4B illustrate another example technique for detecting motion of an input member relative to a device 400. In this example, the device 400 may include a touch sensor that detects contacts of an input member on a touch-sensitive input surface 402. The touch sensor may also be configured to detect the presence of the input member when it is in proximity to but not in contact with the touch-sensitive input surface 402, one example of which is near-field capacitive sensing. For example, a capacitive touch sensor may detect a change in capacitance at a location due to the proximity of the input member 404 (e.g., the user's finger). Parameters such as the magnitude of the change in capacitance may be used to determine factors such as the location of the input member 404, the distance of the input member 404 from the touch-sensitive input surface 402, and the like. Other types of sensing systems that can detect motion near the input surface 402 may also be used, such as ultrasonic sensors, light-based proximity sensors, laser-based sensing systems, structured light sensing systems, optical interferometry-based sensing systems, or other types of sensing systems that can detect motion near the input surface 402, Information from the touch sensor about the location of the input member 404 may be used to determine an intended touch location 408 of the input member 404 (e.g., a location or position on the touch-sensitive input surface 402 where the input member 404 is likely to contact) when the input member 404 is not in contact with the touch-sensitive input surface. In some cases, as shown in FIG. 4A, the intended touch location 408 may be the location on the touch-sensitive input surface 402 that is perpendicularly below the input member at a certain time before a contact is detected and/or when the input member 404 is a certain distance away from the touch-sensitive input surface 402.

FIG. 4B illustrates how the actual location of the contact 410 may differ from the intended touch location 408 due to motion of the device 400 and/or the input member 404. In particular, relative motion between the device 400 and the input member 404, as indicated by arrows 406, may result in a location of contact 410 that differs from the intended touch location 408. (It will be appreciated that the relative motion between the device 400 and the input member 404 may be the result of absolute motion of one or both of the device 400 and the input member 404.) The device 400 may use the intended touch location 408 and the location of contact 410 (and optionally the location(s) of the input member 404 as it moves from a first location as shown in FIG. 4A to a second location as shown in FIG. 4B) to determine relative motion between the device 400 and the input member 404. For example, the device 400 may determine a distance moved by the input member 404 along a direction parallel to the touch-sensitive input surface 402 (e.g., the horizontal component of the motion from the intended touch location 408 and the location of contact 410, relative to the orientation shown in FIG. 4B). The distance may be determined from a time when the input member 404 is a certain distance away from the touch-sensitive input surface 402 (e.g., one inch, two inches, three inches, four inches, or another suitable distance). The device 400 may also determine other characteristics of the relative motion, such as a speed of the input member 404, an acceleration of the input member, or the like.

As described herein, information from multiple sources may be used to determine whether or not a relative motion between an input member and a device is intentional or unintentional. For example, information from accelerometers (or other motion sensing systems) may be used in conjunction with information from the touch sensor of the device 400 and/or the spatial sensor 302 of the device 300 to determine whether detected relative motion is likely an intentional motion (e.g., due to a user simply moving a finger to select a different virtual button), or an unintentional motion (e.g., due to an unexpected force on the user and/or the device, such as a bouncing vehicle interior). For example, if the motion sensing systems indicate that the relative motion detected by a device occurred at or near the same time as an absolute motion of the device and/or the input member (e.g., that satisfies a threshold condition, as described above), the device may determine that the relative motion was likely unintentional, and may apply a correction to the contact location to determine the intended input location. If the motion sensing systems indicate that the relative motion did not coincide with an absolute motion of the device and/or the input member, then the device may determine that the relative motion was likely intentional and not apply any correction. In some cases, whether an absolute motion coincides with a relative motion may be determined using a time window based on the detected force. For example, if relative motion occurs within 0.25 seconds, 0.5 seconds, 0.75 seconds, or 1.0 second of a detected absolute motion (or another suitable time window), the device may associate the relative motion with the absolute motion and apply an appropriate correction to the contact location.

Motion sensing systems, such as accelerometers, that are used to determine motions, forces, and/or accelerations to which devices and input members are subjected, may be incorporated into a device with the touch-sensitive input surface (e.g., the devices 300, 400), or they may be incorporated into an external source such as a wearable device coupled to the input member. As noted above, information from external sources, such as wearable devices, may be provided to the device with the touch-sensitive input surface, which may use such information to determine whether and to what extent any corrections should be applied to the detected contact location.

Figure 5A:
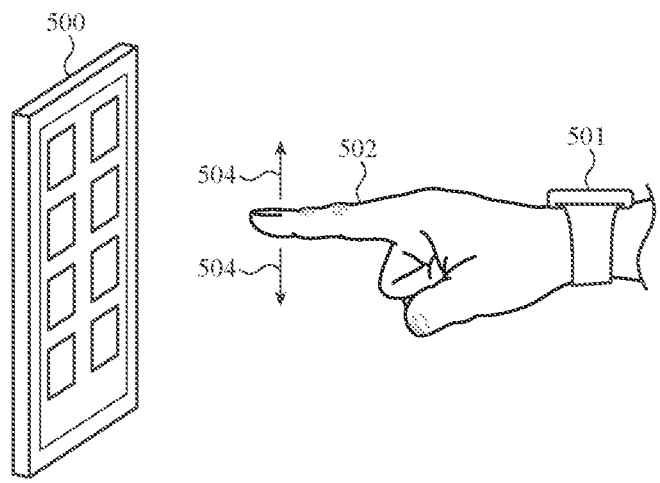
FIGS. 5A-5B illustrate variances in input locations on a touchscreen of an electronic device across multiple inputs.
Figure 5B:
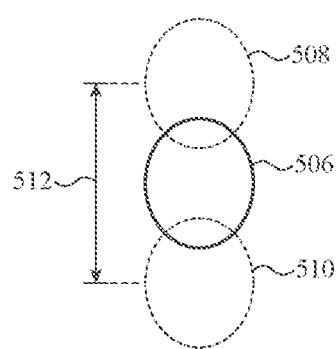

The techniques described herein may be used to compensate for unintentional or unexpected motion from various causes. For example, in a moving vehicle, relative motion of an input member may be produced by bumps in the road, vehicle motion (e.g., turns, accelerations, decelerations), and the like. In some cases, devices may compensate for motion from other causes, such as cyclic or repetitive motions (e.g., tremors) of a user. FIGS. 5A-5B illustrate how cyclic or repetitive motion of a user's hand may be detected and compensated for by a device 500.

FIG. 5A illustrates how a finger 502 of a user's hand may move in a cyclic or repetitive motion (indicated by arrows 504) relative to a device 500 with a touch-sensitive input surface. The relative motion may be detected using sensors of a wearable device, such as an accelerometer of a watch 501, or via any other suitable technique, including spatial sensors (FIG. 3), capacitive sensing (FIGS. 4A-4B), or the like.

FIG. 5B illustrates a characterization of repetitive or cyclic motion of an input member prior to the input member contacting a touchscreen. In particular, the input member may oscillate between a first terminal position 508 and a second terminal position 510, which may be a distance 512 apart. While FIG. 5B illustrates an example of linear motion, this is merely for example purposes, and the same principles described herein apply to other cyclic or repetitive motions, including motion along curved paths.

If an input member (e.g., a finger or a stylus being held by the user) is moving as shown in FIGS. 5A and 5B when the user is attempting to provide touch inputs to a device, the ultimate location of the contact with the touch-sensitive input surface may not be where the user is aiming. For example, if the user is attempting to contact a virtual button below a target position 506, the motion of the input member may result in the actual contact being elsewhere, such as at the first or second terminal positions (or somewhere between them).

In order to compensate for these motions, the device may determine a characteristic (or a model) of the repetitive or cyclic motion and determine an estimated contact target based on the characteristic (or model) of the repetitive or cyclic motion. The location of the estimated contact target for a given type of repetitive or cyclic motion may depend in part on the particular path of the motion. In the example of a symmetrical linear repetitive motion, as shown in FIG. the, estimated contact target may be a middle or centroid of the motion path (e.g., the target position 506). Other types of motion may have other estimated contact targets. For example, the estimated contact targets of a circular or elliptical motion may be a centroid of the circular or elliptical path. As another example, for a motion characterized by a period of stillness at a starting position, with a rapid movement away from (and returning to) the starting position, the estimated contact target may be the starting position.

When a contact is detected by the device 500, the device 500 may determine where the input member was along a cyclic motion path (e.g., based on accelerometer data from a wearable device, a spatial or motion sensing system of the device 500, etc.), and apply a compensation based on the detected location. Thus, for example, the device 500 may detect a contact while the input member is at the first terminal position 508 in FIG. 5B. In such case, using information about the cyclic or repetitive motion path of the input member, the device 500 may apply an offset to the detected location of the actual contact to determine the input location (e.g., a corrected input location). Continuing the example of the motion in FIG. 5B, the device 500 may apply an offset to the first terminal position 508 (the detected actual contact location) to establish the input location (the corrected input location) at the target position 506. Thus, even though a user may have contacted the touch-sensitive input surface when their finger was at the first terminal position 508, the device recognizes the touch input as occurring at the target position 506.

As described above, motion characteristics of relative motion between an input member and a device may be used to determine when and how to compensate for likely erroneous touch inputs. In some cases, touch input compensation may be performed using the motion of a touchscreen device without any information about the motion of the input member (e.g., without any information on the actual relative motion between the device and the input member). In such cases, the device may use an input-location correction model that determines an input location (e.g., the intended input location) based on a contact location between an input member and a touch-sensitive input surface, and detected absolute motion of the device. More particularly, input-location correction models may accept, as inputs, information about the motion of a device (e.g., acceleration data from an accelerometer, or other information from a motion sensing system) and a contact location where an input member has contacted a touch-sensitive input surface. The models may determine, using the inputs, input locations that the device will associate with a touch input. The input locations may differ from the contact location, and different models may produce different input locations for the same contact location. The input-location correction models may ultimately apply distance offsets to the contact location to determine the input locations (or produce input locations that are offset from the contact location by a distance in a direction). The distance offsets may vary between the input-location correction models and may differ based on the detected motion of the device, as described herein.

The input-location correction models may use algorithms to determine input locations (e.g., the location that the device will use as the location of a touch input, despite being different from the actual contact location) based on contact locations and motion information. For example, the input-location correction models may algorithmically characterize how an input member moves, relative to a device, when the device and/or user are subjected to a force that results in motion of the device. As one non-limiting example, an input-location correction model may be configured to compensate for hand motion that will occur in a moving vehicle in response to road bumps. In such case, the model may characterize how a hand is likely to move, relative to the touchscreen, in response to the motion of the touchscreen that is caused by road bumps. For example, when a passenger seated in a vehicle is subjected to a road bump through the seat of the vehicle, the user's hand may move in a certain way relative to the touchscreen. The particular way that the hand moves may be affected by factors such as the suspension of the vehicle, the compliance of the vehicle seat, the compliance of the mounting between the touchscreen and the vehicle, whether or not the user's arm is on an armrest, or the like. The model may account for these factors, such that it can predict, based on the motion experienced by the device and the location of contact with the touchscreen, where the user likely intended to touch. Because this prediction is based on a model that correlates device motion (e.g., absolute motion) and contact locations with input locations, it can determine input locations without requiring actual motion information of the input member. Stated another way, the model can predict or estimate a relative motion between a device and an input member that may have resulted from the same force that produced the absolute motion of the device.

Because the way that a user's hand (or other input member) moves relative to a touchscreen when subjected to external forces may be based on various physical factors, multiple input-location correction models may be provided so that a device can determine corrected input locations in multiple different environments and/or contexts. For example, a first input-location correction model may characterize hand motions relative to a mobile phone that is mounted to a vehicle dashboard, while a second input-location correction model may characterize hand motions relative to a mobile phone being held in a user's hand during vehicle travel, while a third input-location correction model may characterize stylus motions relative to a mobile phone lying flat on a table in a train car during train travel. Any number of input-location correction models may be provided in order to provide input-location correction functions in various different usage contexts.

In cases where a plurality of input-location correction models are available to a device (e.g., stored in memory of the device), the device may select an input-location correction model from a plurality of input-location correction models. The selection of an input-location correction model may be based on various possible factors. The device may therefore select different input-location correction models at different times (e.g., change from a first input-location correction model to a second input-location correction model).

One example factor that may determine what input-location correction model is selected is a usage context of the device. A usage context may refer to an environment or context in which a device may be used, and for which a particular input-location correction model may be associated. For example, a first usage context of a device may correspond to usage of the device in a vehicle, a second usage context may correspond to usage of the device while walking, and a third usage context may correspond to usage of the device on a train. Because the way in which a device and an input member move in these usage contexts may differ, different input-location correction models may be associated with each usage context, and the particular input-location correction model that is selected may be based on the usage context of the device. For example, the device may detect a usage context corresponding to use of the device in a car and may therefore select an input-location correction model that is configured for road vehicle travel. As another example, the device may detect a usage context corresponding to bicycle travel, walking, jogging, train travel, airplane travel, or the like. The device may then select an input-location correction model that is associated with that usage context.

The device may detect a usage context using information from various possible sources, including but not limited to motion sensing systems (e.g., accelerometers, inertial sensing systems, gravitometers, gyroscopes), GPS data (motion and/or position data), or the like. In some cases, information from external sources and/or devices is also or additionally used to detect a usage context (e.g., a vehicle to which the device is physically and/or communicatively coupled, wearable electronic devices to which the device is physically and/or communicatively coupled, etc.).

In some cases, a device selects an input-location correction model based on a location of the device. For example, if the device detects that it is on a freeway, the input-location correction model associated with road vehicle travel may be selected. If the device detects that it is above a threshold altitude (e.g., 10,000 feet), it may select an input-location correction model associated with air travel. The location of the device may be determined using GPS systems, cell-tower triangulation, or any other suitable systems and/or techniques.

In order to characterize how an input member moves relative to a device in response to certain types of forces, input-location correction models may be trained for particular usage contexts and/or environments. In particular, algorithms of an input-location correction model may be derived from actual motion data captured during the intended use. For example, a device and a user may be positioned in a vehicle and subjected to real or simulated driving forces while the user interacts with (e.g., provides touch inputs to) the device. Data characterizing the actual motion of the device the input member may be captured (e.g., motion sensing systems, motion-capture systems, cameras, or any other suitable techniques or systems), and the data may be used to derive the algorithm(s) for an input-location correction model associated with vehicle travel. Similar training procedures may be used for other types of usage contexts and/or use cases (e.g., walking, jogging, bicycle riding, train travel, airplane travel, etc.).

The input-location correction models may be standardized, such that all models associated with a particular usage context are the same across multiple devices and users, or they may be customized for individual devices and/or users. In the latter case, a device may implement a training phase in which motion data of the device and the input member of a user is captured, such as with accelerometers of the device and of a wearable device attached to the user. During the training phase, a default or seed model may be trained or tuned based on the captured motion data. Once the training phase is complete, the device may use the trained model to determine input locations without regard to the actual motion of the input member (e.g., without relative motion data). This may help reduce battery usage of wearable electronic devices during interactions with the device, as the wearable device does not need to record and report motion data to the device. Further, using a trained model (without using real-time motion data from the input member) may allow input-location correction techniques to be used in a wider range of use cases, as input location correction may be applied whether or not a user is wearing a motion-tracking suitable wearable device.

In examples where an input-location correction model is used to determine an input location from a contact location and device motion, the input-location correction model may only be used if a characteristic of a motion prior to the detection of a touch event satisfies a threshold condition. Thus, for example, for small absolute motions of the device (e.g., less than about 0.5 inches, less than about 0.25 inches, or any other suitable value), the device may not make any corrections to the contact location and may simply proceed with the contact location as the input location. If the characteristic of the absolute motion satisfies the threshold condition (e.g., is above the threshold value, as described above), the device uses the input-location correction model to determine an input location that has been corrected to compensate for the device motion.

Figure 6A:
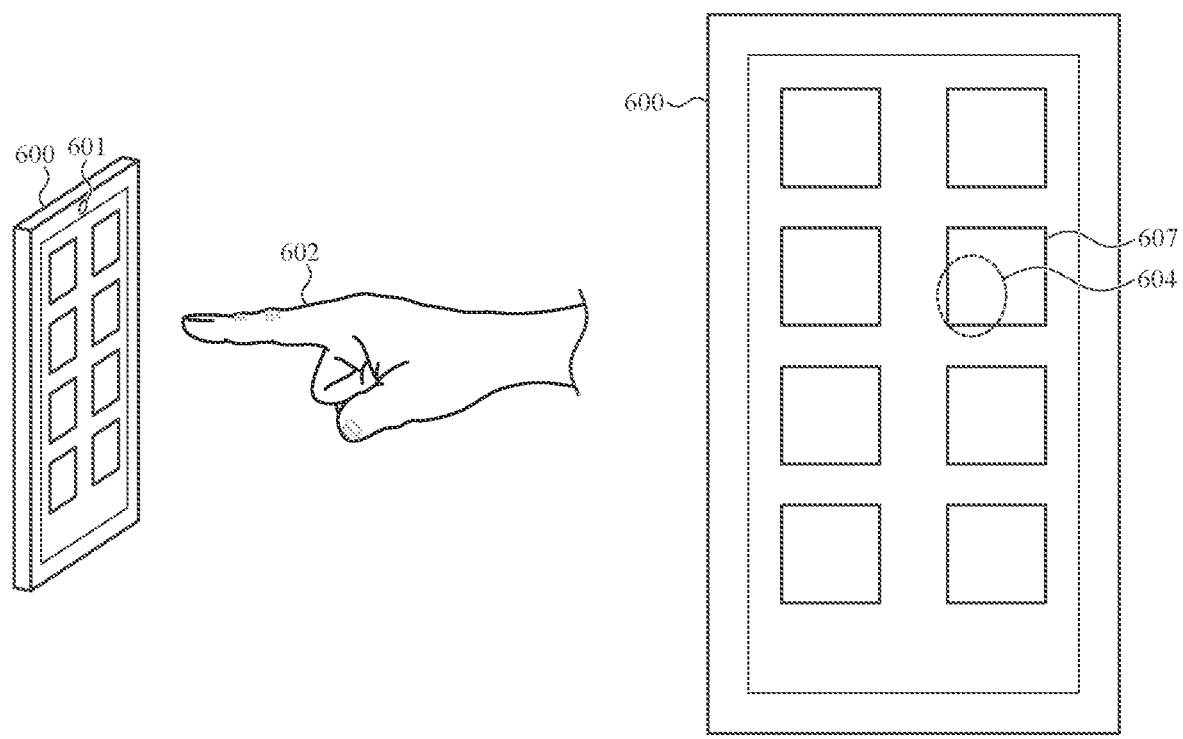
FIG. 6A illustrates a user providing a touch input on a touchscreen of an electronic device.
Figure 6B:
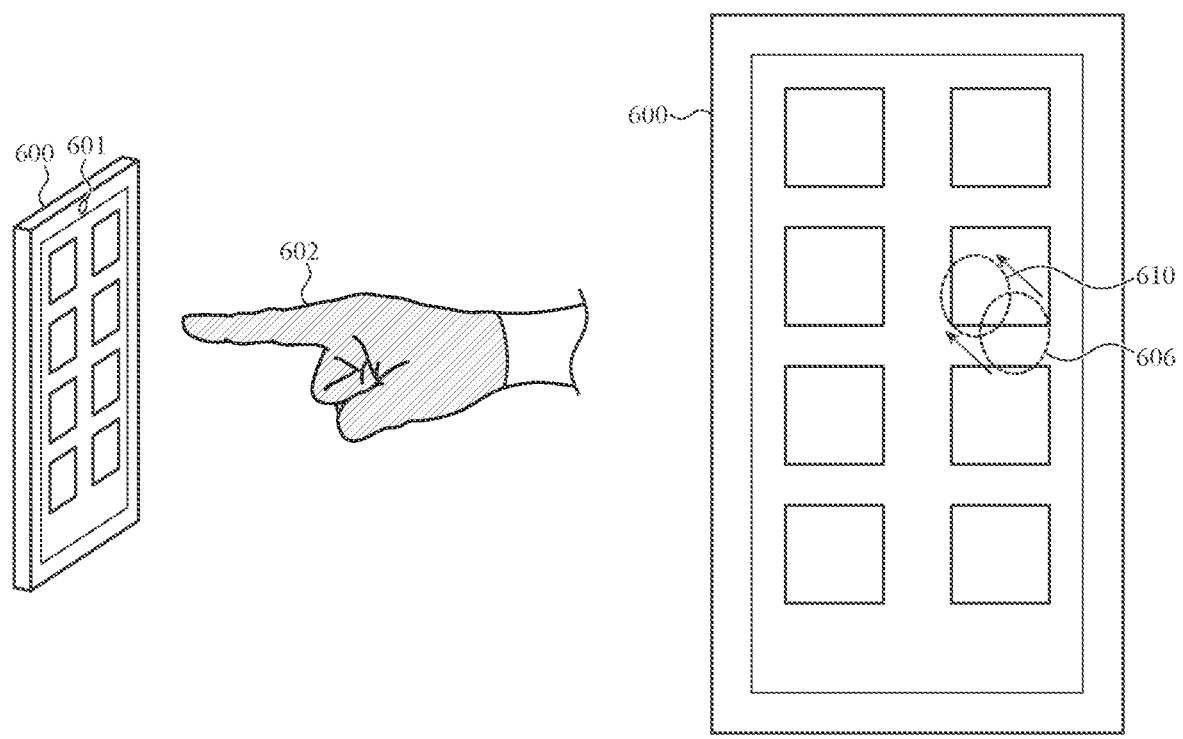
FIG. 6B illustrates the user of FIG. 6A providing a similar touch input to the electronic device of FIG. 6A while wearing a glove, and a resulting inaccuracy of the touch input location.

While various examples herein describe compensating for the relative motion of an input member when providing touch inputs to a device, a device may compensate for various other ways in which a detected location of contact on a touchscreen may not accurately reflect the user's intended target. FIGS. 6A-6B illustrate a general example of how a device 600 may detect and/or compensate for such scenarios. FIG. 6A, for example, illustrates an input member 602 (e.g., a finger of a hand) providing a touch input to a device 600. The right-hand portion of FIG. 6A illustrates a contact location 604 corresponding to a contact between the input member 602 and the device 600. In the example of FIG. 6A, the contact location accurately reflects the user's intended touch location (e.g., corresponding to a selection of a virtual button 607, such as an application icon). Under these conditions, the device 600 may respond to touch inputs without any compensation or correction (e.g., the contact location 604 is treated as the input location).

Various usage conditions may affect how well the contact location of an input member reflects the intended touch target. For example, the contact location may not correspond exactly to the intended touch target if a user's hand is wet, if the user is wearing a glove, if the user is using a different finger than usual, if the user is using the device in a different orientation than normal, or the like. In such cases, the device 600 may use an input-location correction model to compensate for the particular way in which a particular usage condition affects the accuracy of the touch input. For example, FIG. 6B illustrates the input member 602 (e.g., a finger of a hand) providing a touch input to a device 600 when the user is wearing a glove. The right-hand portion of FIG. 6B illustrates a contact location 606 corresponding to a contact between the gloved input member 602 and the device 600. In the example of FIG. 6B, the contact location does not accurately reflect the user's intended touch location 610. Under these conditions, in order to more accurately reflect the user's intention, the device 600 may use an input-location correction model to compensate for the offset. For example, the device 600 may use an input-location correction model associated with gloved hands. The input-location correction model may accept as an input the contact location and provide as an output an input location (where the input location is the location that the device will use as the location of a touch input, despite being different from the actual contact location). In the example of FIG. 6B, the input-location correction model may receive the contact location 606 and provide, as an output, an input location that corresponds to the intended touch location 610. (The input location that is provided by the model may be used as the input location associated with the contact, rather than the contact location.)

While FIG. 6B illustrates an example in which the usage condition corresponds to touch inputs being provided via a gloved hand, this is merely one example that represents a number of usage conditions that may be detected (e.g., by the device 600) and that may be associated with input-location correction models. As noted above, other example usage conditions that may be associated with input-location correction models may include wet hands, alternative finger usage (e.g., a different input-location correction model may be used when the user uses a different finger), different device orientations (e.g., if the user is using the device upside down, or while holding the device horizontally), whether the device is in one-handed operation or two-handed operation, or the like.

The device 600 may detect the usage condition in order to select an appropriate input-location correction model. For example, the device 600 may have an optical sensor 601, such as a camera, that can detect whether a user is wearing a glove or other covering over their hand, which finger is being used to provide the touch inputs, which hand is holding the device, whether the hand is wet, or the like. Other sensors and systems of the device 600 may also be used to determine the usage condition, such as motion sensing systems, a moisture sensor, touch and/or force sensing systems, audio sensing systems, or the like.

While the techniques described herein can compensate for motion and other usage conditions that reduce the accuracy of touch inputs, it is possible that a user may provide an input to the device in a way that appears to the device to be unintentional but is in fact intentional. For example, a user may intentionally and accurately move his or her hand just as a device detects a motion or force, such as a vehicle bounce. In this case, the intentional movement may be mistaken as being caused by the vehicle bounce and the device may attempt to compensate for the force, thus potentially leading to inaccurate determinations of the input location. For some types of inputs, such as skipping a song or changing a volume of the device, this has a relatively low impact on the functionality of the device. Accordingly, if an adjusted or compensated input location corresponds to such non-critical input elements (e.g., virtual buttons associated with skipping songs, changing volume, launching applications, etc.), the device may simply proceed with the adjusted input location.

In the case of more critical input elements, such as input elements that would end or initiate a telephone or video call, send a text message or email, or the like, the device may display a confirmatory user interface under certain conditions prior to executing a function associated with that input element. For example, if the device detects a contact of an input member, and ultimately applies an offset or otherwise modifies the contact location to produce a different input location, the device may also determine whether or not an input element corresponding to the input location is a certain type or category of input element. If the input element is of a certain type or category (e.g., if it is classified as a critical input element), the device may display a confirmatory user interface that requires the user to confirm the critical input. In this way, the user can be assured that the device will not act on critical inputs based on estimations or predictions of the user's intent. In some cases, the confirmatory user interface includes a confirmatory input element (e.g., virtual button) that is larger than the input element associated with the input location. By making the confirmatory input element larger than the original input element, the user may more easily select the intended input element, even while the forces that originally caused the user's hand to move are still present. As used herein, a critical input element may include input elements that initiate or terminate a communication event, such as a video call, audio call (e.g., telephone call), text message, email, or the like.

Figure 7A:
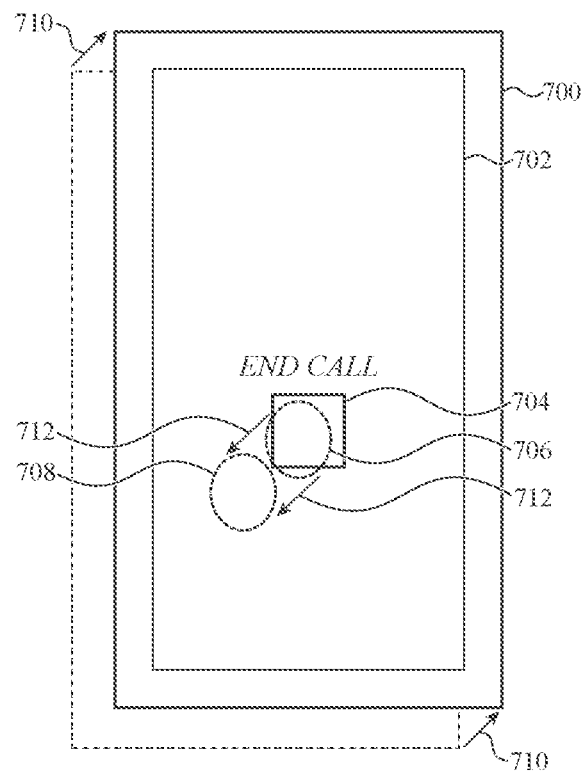
FIGS. 7A-7B illustrate a confirmatory user interface being displayed in response to a touch input to an electronic device.
Figure 7B:
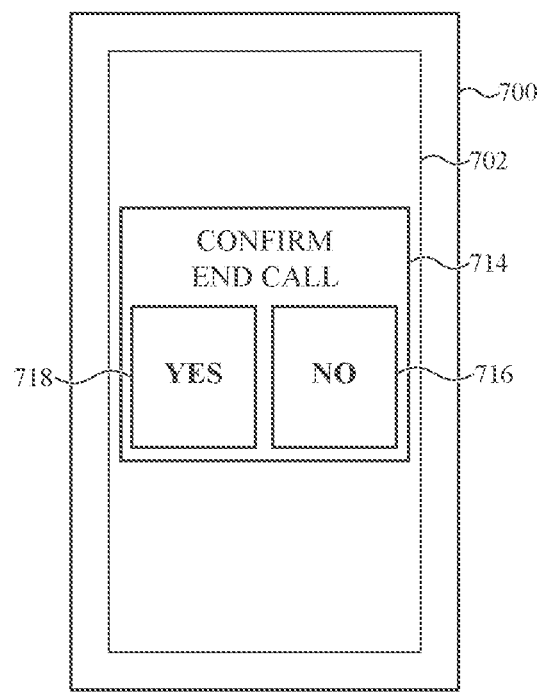

FIGS. 7A-7B illustrate an example confirmatory user interface being displayed on a touchscreen 702 of a device 700. As shown in FIG. 7A, the device 700 displays virtual button 704. In this example, the virtual button 704 is an end-call button that is configured to end a telephone call when selected (e.g., touched or tapped by a user). As noted above, the virtual button 704 may have other functions, such as initiating a telephone call, ending or initiating a video call, sending a message, permanently deleting a file, turning off a vehicle, or the like. FIG. 7A illustrates a contact location 708, where an input member actually contacts the touch-sensitive input surface of the device 700. Using techniques described herein, the device 700 determines that the contact location 708 may not reflect the intended touch target and applies a correction or compensation (e.g., based on relative motion of the device 700 and the input member, as illustrated by arrows 710, 712) to produce the input location 706.

In this case, because the input location 706 resulted from a compensation technique (e.g., the device motion was large enough to cause the device to apply an offset to the contact location), and the input location 706 corresponds to an end-call button 704, the device 700 displays a confirmatory user interface 714 that includes confirmatory buttons 716 and 718. The confirmatory buttons 716, 718 (allowing the user to confirm or reject the end-call function) are larger than the end-call button 704, such that the user can more easily select the desired confirmatory button despite any motion of the device 700 and/or the input member (which initially caused the potentially inaccurate input, and which may still be affecting the device 700 and/or the input member).

Figure 8:
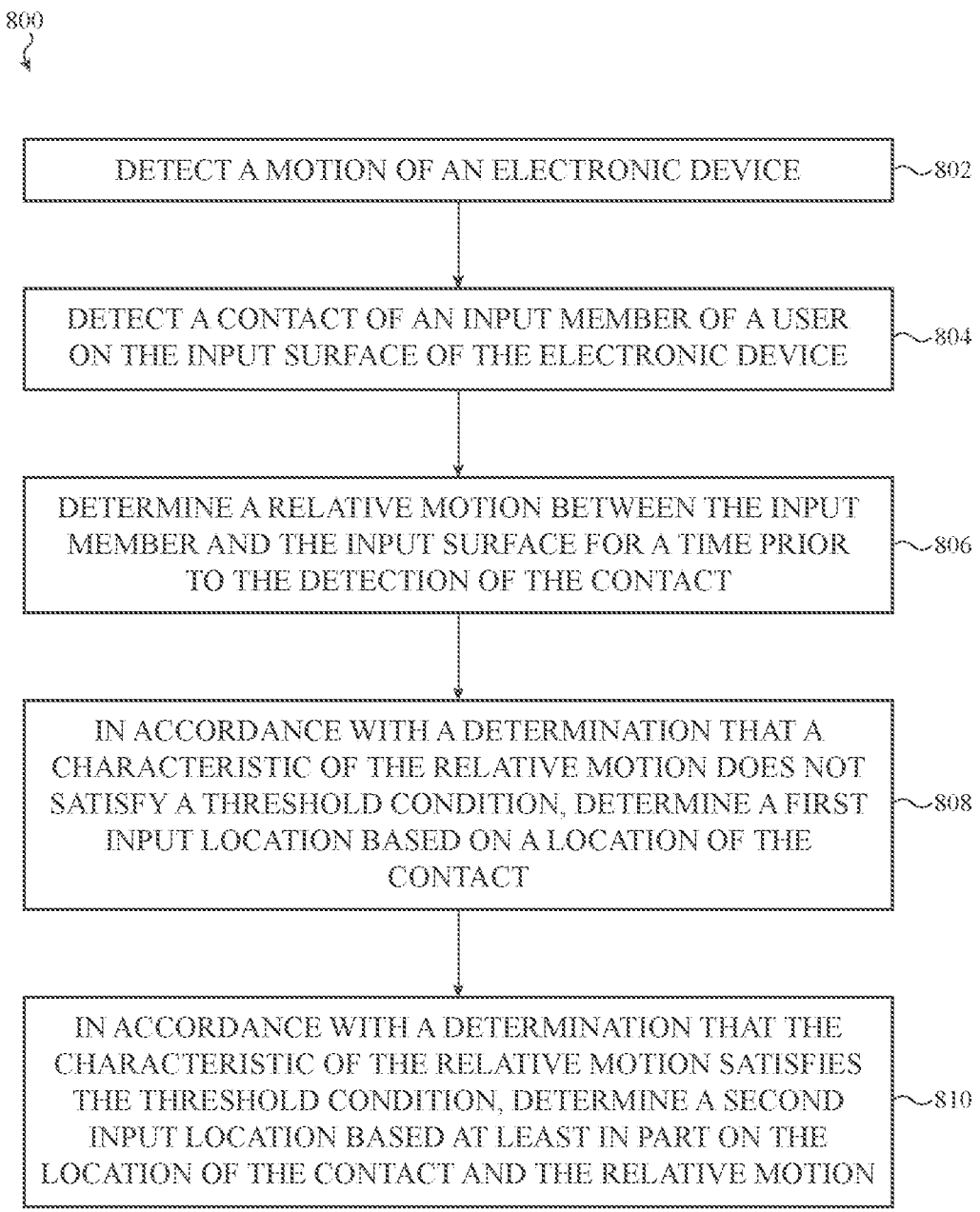
FIG. 8 illustrates an example process for compensating for effects of motion on input accuracy.

FIG. 8 depicts an example flow chart illustrating an example process 900 for compensating for motions of a device and/or input member that may affect touch input accuracy. The process 800 may be performed by any device(s) described herein, including mobile phones, wearable devices, vehicle-mounted touchscreen devices, tablet computers, or the like (e.g., the devices 100, 300, 400, 500, 600, 700, 1000, the wearable electronic device 112, an electronic input member such as a stylus, etc.).

At operation 802, a motion of an electronic device (e.g., the device 100, 300, 400, 500, 600, 700, 1000) may be detected. The motion (e.g., an absolute motion of the electronic device) may be detected by one or more motion sensing systems, as described herein. Detecting the motion may include detecting a characteristic of the motion, including a distance, speed, acceleration, jerk, direction, duration of motion, motion vector, motion path, or any other suitable characteristic of the motion of the device. In some cases, operation 802 includes determining if a characteristic of the detected absolute motion of the device satisfies a threshold condition. The threshold condition may be a value of a characteristic of the absolute motion, as described above. Example characteristics of motion include distance, speed, acceleration, jerk, direction, duration of motion, motion vectors, motion paths, or any other suitable characteristics. If the characteristic of the absolute motion satisfies the threshold condition (e.g., a distance of the absolute motion meets or exceeds a threshold distance, or an acceleration value of the absolute motion meets or exceeds a threshold acceleration, or the like), the device proceeds with the process 800. If the characteristic of the absolute motion fails to satisfy the threshold condition, the process 800 may not be continued (e.g., the device may determine that the force that produced the absolute motion is not likely to have caused an erroneous touch input).

At operation 804, a contact of an input member of a user (e.g., a finger) on the input surface of the electronic device is detected within a time window after the motion of the electronic device is detected. The contact may be detected by a touch sensor of the electronic device, such as a touch sensor associated with a touchscreen display of the electronic device (e.g., the touch sensor 1020). The time window may be used to identify touch inputs that may have been affected by the detected motion of the device, and so that corrective or compensative processes are not applied to touch inputs that are likely not affected by the detected motion. For example, touch inputs that are detected within a certain time window after the detection of an absolute device motion (e.g., within a time window of 1.0 second, 0.75 seconds, 0.5 seconds, seconds, or another suitable time window), may have been affected by the device motion, while touch inputs received outside of the time window may not have been affected by the device motion (e.g., the user may have had sufficient time to correct the position of the input member). By limiting corrective and/or compensative processes to inputs detected within the time window, the device may avoid applying corrections to touch inputs that were not erroneous.

At operation 806, a relative motion between the input member and the input surface is determined for a time prior to the detection of the contact. Determining the relative motion between the input member and the input surface may include detecting motion (e.g., absolute motion) of the user's wrist, such as via a motion sensing system (e.g., an accelerometer) of a wearable electronic device that is coupled to the user, as described with respect to FIGS. 1A-1B. In some cases, determining the relative motion between the input member and the input surface includes detecting motion (e.g., absolute motion) of the electronic device (e.g., using a motion sensing system of the electronic device). Relative motion between the input member and the input surface may then be determined based at least in part on the absolute motion of the user's hand or wrist (as detected by a wearable electronic device) and the absolute motion of the electronic device. For example, the absolute motion of the input member may be subtracted from the absolute motion of the electronic device to determine the relative motion. In some cases, the electronic device receives absolute motion data from a wearable device (e.g., data characterizing the absolute motion of the user's wrist) and determines the relative motion based on the received absolute motion data from the wearable electronic device.

Relative motion information may be recorded for a time period so that it can be analyzed if it is determined that an input received after the relative motion was likely erroneous, as described herein.

In cases where motion data for an input member is captured using a wearable device, such as a smartwatch, the motion data from the smartwatch, which may be attached to the user's wrist or arm, may be used to extrapolate or otherwise estimate motion data of the user's finger, knuckle, or other portion of the user's body that ultimately contacts the touchscreen. In such cases, a position offset may be applied to raw motion data to compensate for the difference between the location of the wearable device and the portion of the user's body that contacts the touchscreen. In some cases, it is assumed that the location of the wearable device and the portion of the user's body that contacts the touchscreen are rigidly fixed relative to one another.

In some cases, determining the relative motion between the input member and the input surface includes capturing, with a camera, video of the input member. The camera may be coupled to or part of the device (e.g., it may be part of a spatial sensor, such as the spatial sensor 302 in FIG. 3). Video of the input member may be analyzed to determine the relative motion between the input member and the input surface (e.g., a distance, speed, acceleration, and/or any other characteristics of the relative motion). Analyzing the video to determine relative motion may include generating a point map of an input member and analyzing the change in position of the points in the point map to determine motion of the input member.

In some cases, relative motion data between the input member and the input surface is determined using a spatial sensor, such as an optical sensing system (e.g., using a camera and video analysis as described above), LIDAR, radar, ultrasonic sensing systems, or the like.

In order to determine the relative motion of the input member prior to detection of the contact, a device may temporarily record motion data representative of the relative motion so that it can be retrieved once a touch input is detected (e.g., within the time window). The motion data may be recorded and stored for the duration of the time window, or slightly longer (e.g., 1.5 or 2 times the duration of the time window, or another suitable value), and deleted thereafter. When a touch input is detected within the time window, the historical relative motion data may be retrieved and analyzed, such as to determine whether the motion of the device likely corresponded to an erroneous touch input location, and how to compensate for any such errors.

At operation 808, in accordance with a determination that a characteristic of the relative motion does not satisfy a threshold condition, a first input location is determined based on a location of the contact. The threshold condition may be a value of a characteristic of the relative motion, as described above. Example characteristics of the relative motion include distance, speed, acceleration, jerk, direction, duration of motion, motion vectors, motion paths, or any other suitable characteristics. The threshold condition of operation 808 may correspond to a threshold distance (e.g., a distance in a plane that is parallel to a plane defined by the touch-sensitive input surface). Thus, if the relative motion does not satisfy the threshold condition (e.g., a distance moved by the user's finger along a direction parallel to an input surface is less than the threshold distance), the input may be assumed not to have been erroneous, and the input location is determined to be the location of the contact (e.g., no compensation or correction is applied).

At operation 810, in accordance with a determination that the characteristic of the relative motion satisfies the threshold condition, a second input location is determined based at least in part on the location of the contact and the relative motion. For example, if the relative motion does satisfy the threshold condition (e.g., a distance moved by the user's finger along a direction parallel to an input surface is equal to or greater than the threshold distance), the input may be assumed to have been erroneous, and a second input location is determined. The device may then proceed to take action based on a touch input having the second input location. For example, the device may perform an action associated with a virtual button at the second input location. Other threshold conditions of the relative motion may also be used to determine if the motion is likely erroneous, such as acceleration values, jerk values, motion paths, or the like. Threshold conditions of relative motion that are indicative of erroneous input locations may be determined experimentally, such as by subjecting users and devices to unexpected bumps (e.g., to simulate operating a touchscreen in a vehicle), and identifying characteristics of unintentional motions.

The second input location may be determined by subtracting a component of absolute motion of the device from the relative motion between the input member and the device. For example, if the absolute motion of the device includes a 1 inch movement in a direction, and the relative motion includes a 1.5 inch movement in the opposite direction, it may be determined that 1 inch of the relative motion is due to the absolute motion of the device, and not an intentional movement of the input member. Accordingly, the device may subtract the 1 inch from the relative motion, thereby establishing the second input location to be where the input member would have contacted the touchscreen if it had moved only the 0.5 inches intended by the user.

As described above, one or multiple threshold conditions relating to characteristics of the absolute and/or relative motion of devices may be used when determining whether a touch input may be erroneous. For example, in some cases, input-location correction techniques may be applied if an absolute motion of a device satisfies a threshold condition, or if a relative motion satisfies a threshold condition, or both.

In some cases, a device may provide additional user interfaces to ensure that critical inputs are not accidentally selected under dynamic motion conditions. For example, in accordance with a determination that a corrected input location corresponds to the location of the end-call button (or other virtual button that is associated with a critical input, such as initiating or terminating a communication event), the electronic device is configured to display, on the display, a confirmatory button that is larger than the end-call button. The user is therefore afforded an opportunity to confirm or reject the selection of the critical input (e.g., the end-call button).

Figure 9:
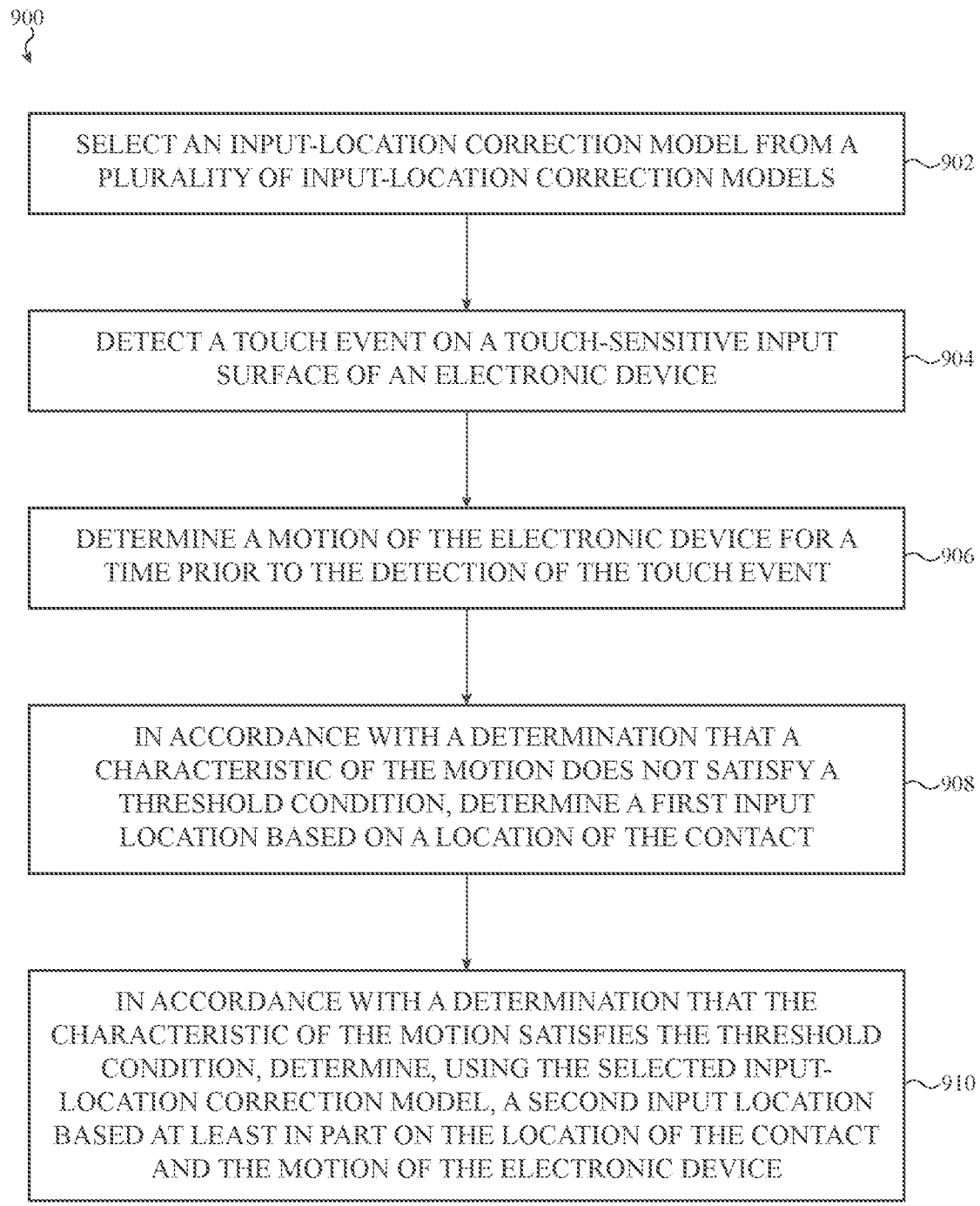
FIG. 9 illustrates another example process for compensating for effects of motion on input accuracy.

FIG. 9 depicts an example flow chart illustrating an example process 900 for compensating for motions of a device and/or input member that may affect touch input accuracy. The process 800 may be performed by any device(s) described herein, including mobile phones, wearable devices, vehicle-mounted touchscreen devices, tablet computers, or the like (e.g., the devices 100, 300, 400, 500, 600, 700, 1000, the wearable electronic device 112, an electronic input member such as a stylus, etc.).

At operation 902, an input-location correction model is selected from a plurality of input-location correction models. As described herein, input-location correction models may accept, as inputs, information about the motion of a device (e.g., acceleration data from an accelerometer, or other information from a motion sensing system) and a contact location where an input member has contacted a touch-sensitive input surface. The input-location correction models may determine, using the inputs, input locations that the device will associate with a touch input. The input locations may differ from the contact location, and different models may produce different input locations for the same contact location. The input-location correction models may ultimately apply distance offsets to the contact location to determine the input locations (or produce input locations that are offset from the contact location by a distance in a direction), as described herein.

In some cases, selecting the input-location correction model includes detecting a usage context of the electronic device, and selecting the input-location correction model from the plurality of input-location correction models based at least in part on the usage context of the electronic device. A usage context may refer to an environment or context in which a device may be used, and for which a particular input-location correction model may be associated. For example, a first usage context of a device may correspond to usage of the device in a vehicle, a second usage context may correspond to usage of the device while walking, and a third usage context may correspond to usage of the device on a train. Because the way in which a device and an input member move in these usage contexts may differ, different input-location correction models may be associated with each usage context, and the particular input-location correction model that is selected may be based on the usage context of the device. For example, the device may detect a usage context corresponding to use of the device in a car and may therefore select an input-location correction model that is configured for road vehicle travel. As another example, the device may detect a usage context corresponding to bicycle travel, walking, jogging, train travel, airplane travel, or the like. The device may then select an input-location correction model that is associated with that usage context.

The usage context of the device may be detected using information from various possible sources, including but not limited to motion sensing systems (e.g., accelerometers, inertial sensing systems, gravitometers, gyroscopes), GPS data (motion and/or position data), or the like. For example, a location of the electronic device may be determined (e.g., that the device is travelling on a road), and the input-location correction model may be selected from the plurality of input-location correction models based at least in part on the location of the electronic device. As described herein, other techniques are also contemplated for determining the usage context of a device, including motion characteristics, external devices to which the device is connected, or the like.

At operation 904, a touch event on a touch-sensitive input surface of an electronic device is detected, the touch event corresponding to a contact by an input member of a user on the touch-sensitive input surface. The touch event may be detected by a touch sensor of the device, such as a touch sensor associated with a touchscreen display of the electronic device (e.g., the touch sensor 1020).

At operation 906, a motion of the electronic device for a time prior to the detection of the touch event may be determined. The motion may be an absolute motion of the device, and it may be determined with a motion sensing system as described herein.

At operation 908, in accordance with a determination that a characteristic of the motion does not satisfy a threshold condition, a first input location may be determined based on a location of the contact. As noted above, a threshold condition may be a value of a characteristic of the absolute motion. Example characteristics of the relative motion include distance, speed, acceleration, jerk, direction, duration of motion, motion vectors, motion paths, or any other suitable characteristics. Motion that does not satisfy the threshold condition may be indicative of motion that is not likely to have caused erroneous inputs. Accordingly, the device may establish the contact location as the input location (e.g., the contact location is not corrected or modified).

At operation 910, in accordance with a determination that the characteristic of the motion satisfies the threshold condition, a second input location is determined based at least in part on the location of the contact and the motion of the electronic device. For example, motion that does satisfy the threshold condition may be indicative of motion that is likely to have caused an erroneous input. Accordingly, the device may determine a corrected input location for this input.

Determining the corrected input location may include providing the motion of the electronic device and the location of the contact to the selected input-location correction model, and receiving, as output from the selected input-location correction model, the corrected input location. The corrected input location may be used as the location of the touch input event. For example, if the corrected input location corresponds to a location of a virtual button on a display associated with the touch-sensitive input surface, the device will perform an action associated with the virtual button.

The input-location correction model may determine the corrected input location by applying a distance offset to the location of a touch contact. The particular distance offset may be based on the motion of the device, and the particular algorithm of the particular input-location correction model. Thus, a first input-location correction model may apply a first distance offset for a particular motion, while a second input-location correction model may apply a second, different distance offset for that same motion. This reflects the differences in the way in which a device and an input member may move relative to one another when subjected to external forces in different usage contexts (e.g., different dynamic motion environments).

The processes 800 and 900 describe applying a correction or compensation to an input after the input is received. In some cases, the device predicts likely input errors due to absolute motion of the device, and modifies its input algorithms after detecting the absolute motion but before detecting a touch input. For example, if the device detects an absolute motion that satisfies a threshold condition (e.g., a large motion that is likely to cause erroneous inputs), the device may adjust its touch sensing system to include a predicted distance offset before any touch inputs are detected. In this way, the predicted result of an external force is already being applied by the device before any inputs are received. The adjustment to the touch sensing system (e.g., to the algorithms that determine a touch input location for a touch event) may last for a duration after the motion. The duration may correspond to the time windows described above. In some cases, the duration is scaled based on a characteristic of the motion, such as a duration of the motion or a distance of the motion.

Figure 10:
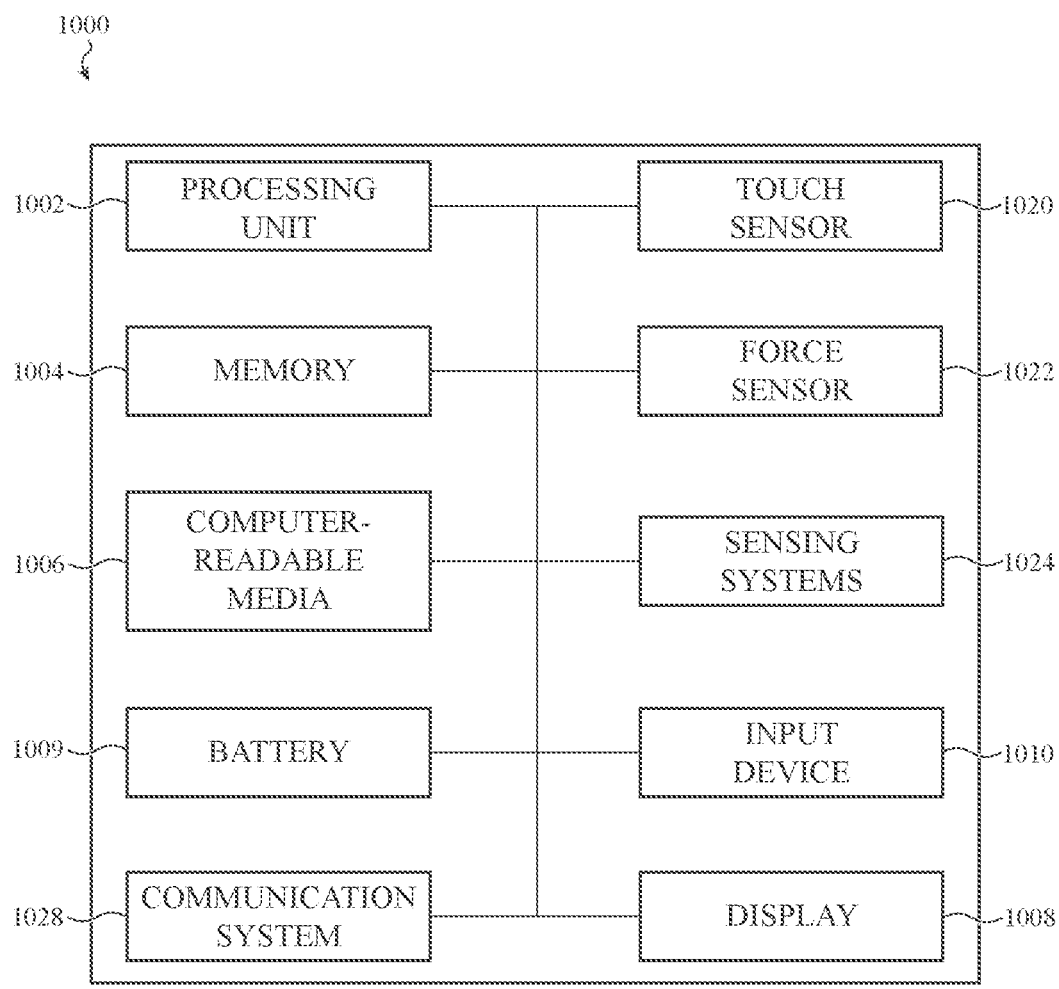
FIG. 10 depicts example components of an electronic device.

FIG. 10 depicts an example schematic diagram of an electronic device 1000. By way of example, the device 1000 of FIG. 10 may correspond to any of the electronic devices described herein, such as the electronic devices 100, 300, 400, 500, 600, 700, the wearable devices 112, 501, input systems (e.g., styli), or the like. The device 1000 may be a stand-alone mobile device, such as a mobile phone, tablet computer, wearable device (e.g., smart watch), or the like. In some cases, the electronic device is a vehicle or integrated with a vehicle (e.g., such as when a touchscreen device is permanently or removably attached to a dashboard of a vehicle). In cases where multiple devices are used to implement the techniques described herein, each device may be understood to be an embodiment of the device 1000 of FIG. 10.

To the extent that multiple functionalities, operations, and structures are disclosed as being part of, incorporated into, or performed by the device 1000, it should be understood that various embodiments may omit any or all such described functionalities, operations, and structures. Thus, different embodiments of the device 1000 may have some, none, or all of the various capabilities, apparatuses, physical features, modes, and operational parameters discussed herein. Further, details of the electronic device that are shown and/or described herein will be understood to apply equally to the electronic device 1000. For example, device components, application software, graphical user interfaces, etc., may all be embodied by the device 1000.

As shown in FIG. 10, a device 1000 includes a processing unit 1002 operatively connected to computer memory 1004 and/or computer-readable media 1006. The processing unit 1002 may be operatively connected to the memory 1004 and computer-readable media 1006 components via an electronic bus or bridge. The processing unit 1002 may include one or more computer processors or microcontrollers that are configured to perform operations in response to computer-readable instructions. The processing unit 1002 may include the central processing unit (CPU) of the device. Additionally or alternatively, the processing unit 1002 may include other processors within the device including application specific integrated chips (ASIC) and other microcontroller devices.

The memory 1004 may include a variety of types of non-transitory computer-readable storage media, including, for example, read access memory (RAM), read-only memory (ROM), erasable programmable memory (e.g., EPROM and EEPROM), or flash memory. The memory 1004 is configured to store computer-readable instructions, sensor values, and other persistent software elements. Computer-readable media 1006 also includes a variety of types of non-transitory computer-readable storage media including, for example, a hard-drive storage device, a solid-state storage device, a portable magnetic storage device, or other similar device. The computer-readable media 1006 may also be configured to store computer-readable instructions, sensor values, and other persistent software elements.

In this example, the processing unit 1002 is operable to read computer-readable instructions stored on the memory 1004 and/or computer-readable media 1006. The computer-readable instructions may be provided as a computer-program product, software application, or the like.

As shown in FIG. 10, the device 1000 also includes a display 1008. The display 1008 may include a liquid-crystal display (LCD), organic light emitting diode (OLED) display, light emitting diode (LED) display, or the like. If the display 1008 is an LCD, the display 1008 may also include a backlight component that can be controlled to provide variable levels of display brightness. If the display 1008 is an OLED or LED type display, the brightness of the display 1008 may be controlled by modifying the electrical signals that are provided to display elements. The display 1008 may correspond to any of the displays shown or described herein, such as the display 102 (FIG. 1A).

The device 1000 may also include a battery 1009 that is configured to provide electrical power to the components of the device 1000. The battery 1009 may include one or more power storage cells that are linked together to provide an internal supply of electrical power. The battery 1009 may be operatively coupled to power management circuitry that is configured to provide appropriate voltage and power levels for individual components or groups of components within the device 1000. The battery 1009, via power management circuitry, may be configured to receive power from an external source, such as an AC power outlet, a charging dock, an auxiliary battery, a battery-enabled protective case, or the like. The battery 1009 may store received power so that the device 1000 may operate without connection to an external power source for an extended period of time, which may range from several hours to several days. Power management circuitry may include wireless charging components, such as a charging coil that inductively couples to an output coil of a wireless charger to charge the battery 1009.

In some embodiments, the device 1000 includes one or more input devices 1010. An input device 1010 is a device that is configured to receive user input. The one or more input devices 1010 may include, for example, a rotatable input system, a push button, a touch-activated button, a keyboard, a keypad, or the like (including any combination of these or other components). In some embodiments, the input device 1010 may provide a dedicated or primary function, including, for example, a power button, volume buttons, home buttons, scroll wheels, and camera buttons.

The device 1000 may also include one or more sensing systems 1024. Sensing systems 1024 may include systems for sensing various different characteristics, parameters, and/or environments of or related to the device 1000. One example sensing system 1024 is one or more motion sensing systems. Motion sensing systems may be configured to detect characteristics of motion of the device 1000, including but not limited to distance, speed, acceleration, jerk, direction, duration of motion, motion vectors, motion paths, or any other suitable characteristics. Motion sensing systems may detect absolute motion of a device and/or relative motion between multiple objects or devices (e.g., between a device and an input member). Sensing systems 1024, such as motion sensing systems, may include various types of sensors and/or sensing subsystems and associated components and circuitry to facilitate the detection, measurement, reporting, and/or other functionality related to sensing functions. For example, sensing systems 1024 may include or use accelerometers, altimeters, moisture sensors, inertial measurement units, spatial sensors, cameras, ambient light sensors, gyroscopic sensors, global positioning systems, optical motion sensing systems (e.g., cameras, depth sensors, etc.), radar systems, LIDAR systems, or the like. Sensing systems 1024 may be used to detect information or conditions as described herein, such as device motion, forces and/or accelerations to which a device is subjected, relative motion between an electronic device and an input member, motion of an input member, or the like.

Sensing systems 1024 may also include a biometric sensor, such as a heart rate sensor, electrocardiograph sensor, temperature sensor, or any other type of sensor. In cases where the sensing system 1024 is a biometric sensor, it may include biometric sensing circuitry. Biometric sensing circuitry may include components such as processors, capacitors, inductors, transistors, analog-to-digital converters, or the like.

The device 1000 may also include a touch sensor 1020 that is configured to determine a location of a touch on a touch-sensitive surface of the device 1000 (e.g., an input surface defined by the cover 104). The touch sensor 1020 may use or include capacitive sensors, resistive sensors, surface acoustic wave sensors, piezoelectric sensors, strain gauges, or the like. In some cases, the touch sensor 1020 associated with a touch-sensitive surface of the device 1000 may include a capacitive array of electrodes or nodes that operate in accordance with a mutual-capacitance or self-capacitance scheme. The touch sensor 1020 may be integrated with one or more layers of a display stack (e.g., the display 102, FIG. 1A) to provide the touch-sensing functionality of a touchscreen.

The device 1000 may also include a force sensor 1022 that is configured to receive and/or detect force inputs applied to a user input surface of the device 1000 (e.g., a surface of the cover 104). The force sensor 1022 may use or include capacitive sensors, resistive sensors, surface acoustic wave sensors, piezoelectric sensors, strain gauges, or the like. In some cases, the force sensor 1022 may include or be coupled to capacitive sensing elements that facilitate the detection of changes in relative positions of the components of the force sensor (e.g., deflections caused by a force input). The force sensor 1022 may be integrated with one or more layers of a display stack (e.g., the display 102) to provide force-sensing functionality of a touchscreen.

The device 1000 may also include communication systems 1028 that are configured to transmit and/or receive signals or electrical communication from an external or separate device. The communication port 1028 may be configured to couple to an external device via a cable, adaptor, or other type of electrical connector, or via one or more wireless communication protocols (Bluetooth, Wi-Fi, cellular communications, etc.). The communication systems 1028 may facilitate the communication of motion and/or other information between devices, such as to send and receive motion data between a wearable electronic device (e.g., a smartwatch) and a touchscreen device (e.g., a mobile phone, a dash-mounted touchscreen, etc.), or any other communications described herein.

While the device 1000 is described as having a particular set of components, the device 1000 is not limited to only those components described herein. For example, a device may include more than one of the components described with respect to FIG. 10 or elsewhere in the instant application, and may indeed include other components not described herein.

As described above, one aspect of the present technology is the gathering and use of data available from various sources to improve the usefulness of the devices described herein. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to the benefit of users. For example, the personal information data can be used to provide customized graphical user interfaces and user experiences. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above and below, or their synonyms, do not necessarily refer to an absolute position relative to an external reference, but instead refer to the relative position of components with reference to the figures.

What is claimed is:

1. An electronic device, comprising:
   a housing;
   a cover defining an input surface of the electronic device;
   a motion sensing system configured to detect a motion of the electronic device;
   wherein:
   the electronic device is configured to:
      determine a relative motion between an input member and the input surface for a time prior to detecting a contact between the input member and the input surface;
      detect the contact between the input member and the input surface at a contact location of the input surface;
      in accordance with a first determination that a characteristic of the relative motion does not satisfy a threshold condition, determine a first input location based on the contact location;
      in accordance with a second determination that the characteristic of the relative motion satisfies the threshold condition, determine a second input location based at least in part on the contact location and the relative motion.

2. The electronic device of claim 1, wherein:
   the input member is a finger of the user;
   determining the relative motion comprises:
      receiving motion data from a wearable electronic device coupled to the user; and
      determining the relative motion based on the received motion data from the wearable electronic device;
   the characteristic of the relative motion is a distance moved by the user's finger along a direction parallel to the input surface; and
   the threshold condition is a threshold distance.

3. The electronic device of claim 1, wherein determining the relative motion between the input member and the input surface comprises detecting motion of the user's wrist.

4. The electronic device of claim 3, wherein the motion of the user's wrist is detected using an accelerometer of a wearable electronic device.

5. The electronic device of claim 3, wherein determining the relative motion between the input member and the input surface further comprises:
   detecting the motion of the electronic device; and
   determining the relative motion between the input member and the input surface based at least in part on the motion of the user's wrist and the motion of the electronic device.

6. The electronic device of claim 1, wherein:
   the electronic device further comprises a camera; and
   determining the relative motion between the input member and the input surface comprises:
      capturing, with the camera, video of the input member; and
      analyzing the video of the input member to determine the relative motion between the input member and the input surface.

7. The electronic device of claim 1, comprising:
   a display, wherein:
      the cover is positioned over the display;
      in accordance with a third determination that the first input location corresponds to a location of an end-call button displayed on the display, the electronic device is configured to end a telephone call; and
      in accordance with a fourth determination that the second input location corresponds to the location of the end-call button, the electronic device is configured to display, on the display, a confirmatory button that is larger than the end-call button.

8. A method for determining an input location on a surface of an electronic device, comprising:
   selecting an input-location correction model from a plurality of input-location correction models;
   detecting a contact by an input member of a user on the surface at a contact location;
   determining, for a time prior to the detection of the contact, a motion of the electronic device;
   in accordance with a first determination that a characteristic of the motion does not satisfy a threshold condition, determining a first input location based on the contact location; and in accordance with a second determination that the characteristic of the motion satisfies the threshold condition, determining a second input location based at least in part on the contact location and the motion of the electronic device, the determining comprising:
providing the motion of the electronic device and the contact location to the selected input-location correction model; and
receiving, as output from the selected input-location correction model, the second input location.

9. The method of claim 8, wherein:
the method further comprises detecting a usage context of the electronic device; and
the input-location correction model is selected from the plurality of input-location correction models based at least in part on the usage context of the electronic device.

10. The method of claim 9, wherein the usage context corresponds to travel in a vehicle.

11. The method of claim 8, wherein:
the method further comprises detecting a location of the electronic device; and
the input-location correction model is selected from the plurality of input-location correction models based at least in part on the location of the electronic device.

12. The method of claim 8, further comprising, in accordance with a third determination that the second input location corresponds to a location of a virtual button on a display associated with the surface, performing an action associated with the virtual button.

13. The method of claim 8, wherein:
the input-location correction model is a first input-location correction model;
the contact is a first contact;
the contact location is a first contact location;
the motion of the electronic device is a first motion of the electronic device; and
the method further comprises:
after receiving the second input location, detecting a change in a usage context of the electronic device;
in response to detecting the change in the usage context of the electronic device, selecting a second input-location correction model from the plurality of input-location correction models, the second input-location correction model different from the first input-location correction model;
detecting a second contact by the input member of the user on the surface;
determining, for a time prior to the detection of the second contact, a second motion of the electronic device; and
in accordance with a third determination that a characteristic of the second motion satisfies the threshold condition, determining, using the second input-location correction model, a third input location based at least in part on a location of the second contact and the second motion of the electronic device.

14. The method of claim 13, wherein:
the first input-location correction model applies a first distance offset to the first contact to determine the second input location; and
the second input-location correction model applies a second distance offset, different from the first distance offset, to determine the third input location.

15. A method for determining an input location on a surface of an electronic device, comprising:
detecting a contact of an input member at a contact location of the surface;
determining, for a time prior to the detection of the contact, a distance moved by the input member relative to the surface;
in accordance with a first determination that the distance moved by the input member relative to the surface does not satisfy a threshold condition, determining a first input location based on the contact location; and
in accordance with a second determination that the distance moved by the input member relative to surface satisfies the threshold condition, determining a second input location based at least in part on the contact location and the distance moved by the input member relative to the surface.

16. The method of claim 15, wherein determining the distance moved by the input member relative to the surface comprises detecting motion of the user's wrist using an accelerometer of a wearable electronic device that is coupled to the user.

17. The method of claim 15, wherein the distance moved by the input member relative to the surface is a distance in a first plane that is parallel to a second plane defined by the surface.

18. The method of claim 16, wherein:
the threshold condition is a first threshold condition;
the method further comprises, prior to detecting the contact of the input member on the surface, detecting a motion of the electronic device; and
the operation of determining the second input location is performed if the distance moved by the input member relative to the surface satisfies the first threshold condition and the motion of the electronic device satisfies a second threshold condition.

19. The method of claim 15, wherein determining the distance moved by the input member relative to the surface comprises:
capturing video of the input member; and
analyzing the video of the input member to determine the distance moved by the input member relative to the surface.

20. The method of claim 19, wherein capturing the video of the input member comprises capturing the video of the input member using a camera coupled to the electronic device.

* * * * *